US009405567B2

(12) United States Patent
Robenko et al.

(10) Patent No.: US 9,405,567 B2
(45) Date of Patent: Aug. 2, 2016

(54) METHOD AND APPARATUS FOR SUPPORTING ADDRESS TRANSLATION IN A MULTIPROCESSOR VIRTUAL MACHINE ENVIRONMENT USING TRACKING DATA TO ELIMINATE INTERPROCESSOR INTERRUPTS

(76) Inventors: Alexander Robenko, Brisbane (AU); Andrew Anderson, Forest Grove, OR (US)

(*) Notice: Subject to any disclaimer, the term of this patent is extended or adjusted under 35 U.S.C. 154(b) by 76 days.

(21) Appl. No.: 13/997,289

(22) PCT Filed: Feb. 7, 2012

(86) PCT No.: PCT/US2012/024155
§ 371 (c)(1),
(2), (4) Date: Jul. 8, 2014

(87) PCT Pub. No.: WO2013/119211
PCT Pub. Date: Aug. 15, 2013

(65) Prior Publication Data
US 2014/0331224 A1 Nov. 6, 2014

(51) Int. Cl.
G06F 12/00 (2006.01)
G06F 9/455 (2006.01)
G06F 12/10 (2016.01)

(52) U.S. Cl.
CPC ........ *G06F 9/45533* (2013.01); *G06F 9/45558* (2013.01); *G06F 12/1009* (2013.01); *G06F 2009/45583* (2013.01)

(58) Field of Classification Search
CPC .. G06F 12/00; G06F 12/0615; G06F 12/0623

USPC .................. 711/100, 154, 200, 206
See application file for complete search history.

(56) References Cited

U.S. PATENT DOCUMENTS

2006/0259734 A1* 11/2006 Sheu ................... G06F 12/1036
711/203

(Continued)

FOREIGN PATENT DOCUMENTS

WO 2013119211 A1 8/2013

OTHER PUBLICATIONS

International Search Report and Written Opinion received for International Application No. PCT/US2012/024155, mailed on Oct. 31, 2012,11 pages.

(Continued)

*Primary Examiner* — Tuan Thai
(74) *Attorney, Agent, or Firm* — Thomas R. Lane

(57) ABSTRACT

In one embodiment, a method includes creating a first working set of shadow page table hierarchies for a first processor of a plurality of processors, creating a second working set of shadow page table hierarchies for a second processor of the plurality of processors, keeping a record of modified guest page tables, and synchronizing each modified guest page table with a corresponding shadow page table in the first working set. For each modified guest page table in the modified guest page tables record, an entry includes an indication of which of the plurality of processors have a hardware translation lookaside buffer containing a writable reference to the modified guest page table.

16 Claims, 17 Drawing Sheets

PD = page directory
PT = page table
F = page frame

(56) References Cited

U.S. PATENT DOCUMENTS

| | | | |
|---|---|---|---|
| 2007/0294505 A1* | 12/2007 | Traut | G06F 12/1036 711/207 |
| 2008/0155168 A1 | 6/2008 | Sheu et al. | |
| 2008/0215848 A1 | 9/2008 | Sheu et al. | |
| 2009/0006805 A1* | 1/2009 | Anderson | G06F 12/1036 711/207 |
| 2009/0300263 A1* | 12/2009 | Devine | G06F 12/1009 711/6 |
| 2009/0327575 A1* | 12/2009 | Durham | G06F 12/145 711/6 |
| 2010/0031360 A1* | 2/2010 | Seshadri | G06F 21/57 726/24 |
| 2011/0016290 A1* | 1/2011 | Chobotaro | G06F 9/45558 711/207 |

OTHER PUBLICATIONS

International Preliminary Report on Patentability received for PCT Patent Application No. PCT/US2012/024155, mailed on Aug. 21, 2014, 10 pages.

European Search Report received for European Patent Application No. 12868166.5 mailed on Sep. 23, 2015, 10 pages of Search Report.

Villavieja et al., DiDi: Mitigating The Performance Impact of TLB Shootdowns Using a Shared TLB Directory, IEEE 2011 International Conference on Parallel Architectures and Compilation Techniques, 2011, pp. 340-349.

Sobania et al., Towards Symmetric Multi-Processing Support for Operating Systems on the SCC, 4th MARC Symposium, Dec. 8-9, 2011, pp. 1-6.

* cited by examiner

METHOD AND APPARATUS FOR SUPPORTING ADDRESS TRANSLATION IN A MULTIPROCESSOR VIRTUAL MACHINE ENVIRONMENT USING TRACKING DATA TO ELIMINATE INTERPROCESSOR INTERRUPTS

FIELD

Embodiments of the invention relate generally to virtual machines, and more specifically to supporting address translation in a virtual machine environment.

BACKGROUND

A conventional virtual-machine monitor (VMM) typically runs on a computer and presents to other software the abstraction of one or more virtual machines. Each virtual machine may function as a self-contained platform, running its own "guest operating system" (i.e., an operating system (OS) hosted by the VMM) and other software, collectively referred to as guest software. The guest software expects to operate as if it were running on a dedicated computer rather than a virtual machine. That is, the guest software expects to control various events and have access to hardware resources such as physical memory and memory-mapped input/output (I/O) devices. For example, the guest software expects to maintain control over address-translation operations and have the ability to allocate physical memory, provide protection from and between guest applications, use a variety of paging techniques, etc. However, in a virtual-machine environment, the VMM should be able to have ultimate control over the computer's resources to provide protection from and between virtual machines.

BRIEF DESCRIPTION OF THE DRAWING

The present invention is illustrated by way of example, and not by way of limitation, in the figures of the accompanying drawings and in which like reference numerals refer to similar elements and in which.

DESCRIPTION OF EMBODIMENTS

Figure 1:
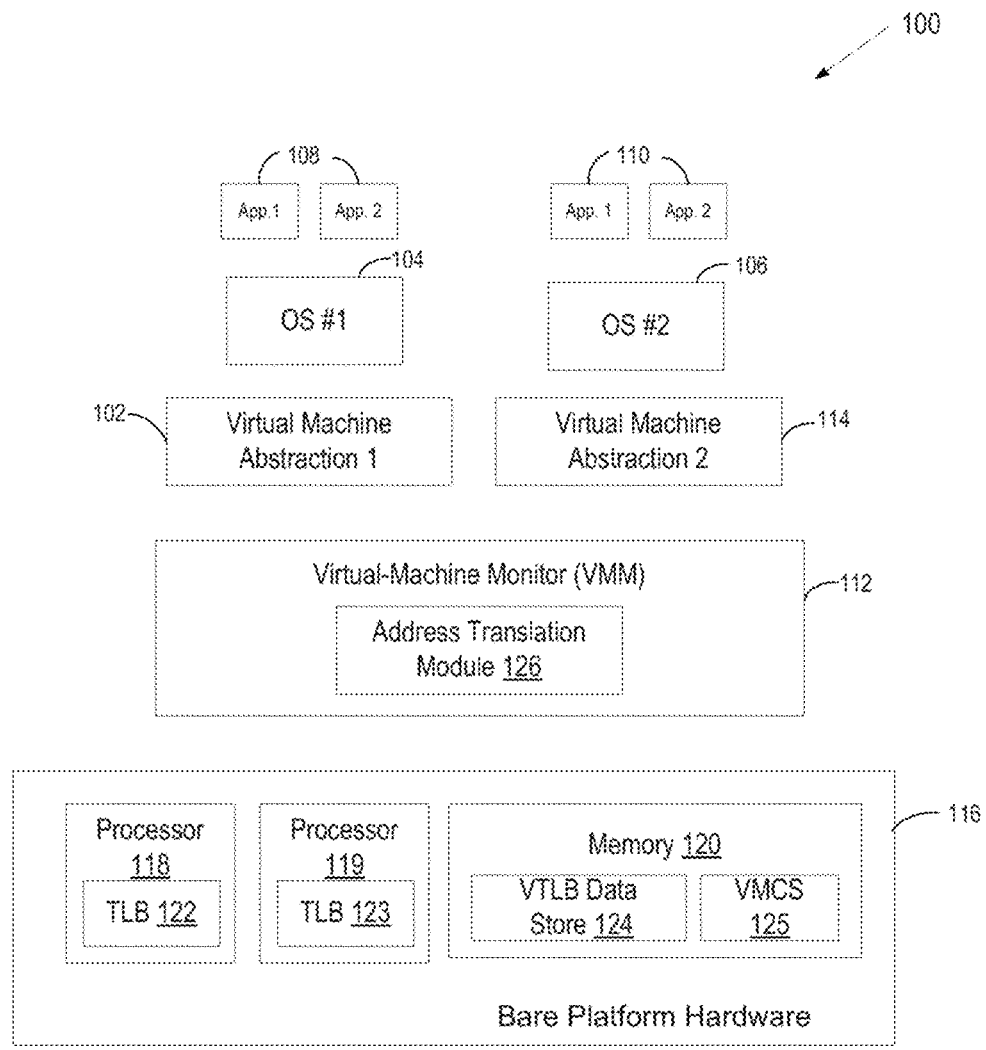
FIG. 1 illustrates one embodiment of a virtual-machine environment, in which the present invention may operate.

A method and apparatus for supporting address translation in a multiprocessor virtual machine environment is described. In the following description, for purposes of explanation, numerous specific details are set forth in order to provide a thorough understanding of the present invention. It will be apparent, however, to one skilled in the art that the present invention can be practiced without these specific details.

Some portions of the detailed descriptions that follow are presented in terms of algorithms and symbolic representations of operations on data bits within a computer system's registers or memory. These algorithmic descriptions and representations are the means used by those skilled in the data processing arts to convey most effectively the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer-system memories or registers or other such information storage, transmission or display devices.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

Although the below examples may describe providing support for address translation in a virtual machine environment in the context of execution units and logic circuits, other embodiments of the present invention can be accomplished by way of software. For example, in some embodiments, the present invention may be provided as a computer program product or software which may include a machine or computer-readable medium having stored thereon instructions which may be used to program a computer (or other electronic devices) to perform a process according to the present invention. In other embodiments, processes of the present invention might be performed by specific hardware components that contain hardwired logic for performing the processes, or by any combination of programmed computer components and custom hardware components.

Thus, a machine-readable medium may include any mechanism for storing or transmitting information in a form readable by a machine (e.g., a computer), but is not limited to, floppy diskettes, optical disks, Compact Disc, Read-Only Memories (CD-ROMs), and magneto-optical disks, Read-Only Memories (ROMs), Random Access Memories (RAMs), Erasable Programmable Read-Only Memories (EPROMs), Electrically Erasable Programmable Read-Only Memories (EEPROMs), magnetic or optical cards, flash memories, a transmission over the Internet, electrical, optical, acoustical or other forms of propagated signals (e.g., carrier waves, infrared signals, digital signals, etc.) the like.

Further, a design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, data representing a hardware model may be the data specifying the presence or absence of various features on different mask layers for masks used to produce the integrated circuit. In any representation of the design, the data may be stored in any form of a machine-readable medium. An optical or electrical wave modulated or otherwise generated to transmit such information, a memory, or a magnetic or optical storage such as a disc may be the machine readable medium. Any of these mediums may "carry" or "indicate" the design or software information. When an electrical carrier wave indicating or carrying the code or design is transmitted, to the extent that copying, buffering, or re-transmission of the electrical signal is performed, a new copy is made. Thus, a communication provider or a network provider may make copies of an article (a carrier wave) embodying techniques of the present invention.

FIG. 1 illustrates one embodiment of a virtual-machine environment 100, in which the present invention may operate. In this embodiment, bare platform hardware 116 comprises a computing platform, which may be capable, for example, of executing a standard operating system (OS) or a virtual-machine monitor (VMM), such as a VMM 112.

The VMM 112, typically implemented in software, may emulate and export a bare machine interface to higher level software. Such higher level software may comprise a standard or real-time OS, may be a highly stripped-down operating environment with limited operating system functionality, may not include traditional OS facilities, etc. Alternatively, for example, the VMM 112 may be run within, or on top of, another VMM. VMMs may be implemented, for example, in hardware, software, firmware or by a combination of various techniques.

The platform hardware 116 may be of a personal computer (PC), mainframe, handheld device, portable computer, set-top box, or any other computing system. The platform hardware 116 includes processor 118, processor 119, and memory 120.

Processors 118 and 119 may be any type of processor capable of executing software, such as a microprocessor, digital signal processor, microcontroller, or the like. Processors 118 and 119 may be separate processors of the same or of two different types, or may each be a separate execution core of a multicore processor. Processors 118 and 119 may include microcode, programmable logic or hardcoded logic for performing the execution of method embodiments of the present invention. Although FIG. 1 shows only two such processors 118 and 119, there may be more than two processors in the system.

Memory 120 may be a hard disk, a floppy disk, random access memory (RAM) (e.g., dynamic RAM (DRAM) or static RAM (SRAM)), read only memory (ROM), flash memory, any combination of the above devices, or any other type of machine medium readable by processors 118 and 119. Memory 120 may store instructions and/or data for performing the execution of method embodiments of the present invention.

The VMM 112 presents to other software (i.e., "guest" software) the abstraction of one or more virtual machines (VMs), which may provide the same or different abstractions to the various guests. FIG. 1 shows two VMs, 102 and 114. The guest software running on each VM may include a guest OS such as a guest OS 104 or 106 and various guest software applications 108 and 110. Each of the guest OSs 104 and 106 expects to access physical resources (e.g., processor registers, memory and I/O devices) within the VMs 102 and 114 on which the guest OS 104 or 106 is running and to perform other functions. For example, the guest OS 104 or 106 expects to have access to all registers, caches, structures, PO devices, memory and the like, according to the architecture of the processor and platform presented in the VM 102 and 114. The resources that can be accessed by the guest software may either be classified as "privileged" or "non-privileged." For privileged resources, the VMM 112 facilitates functionality desired by guest software while retaining ultimate control over these privileged resources. Non-privileged resources do not need to be controlled by the VMM 112 and can be accessed directly by guest software.

Further, each guest OS expects to handle various fault events such as exceptions (e.g., page faults, general protection faults, etc.), interrupts (e.g., hardware interrupts, software interrupts), and platform events (e.g., initialization (MIT) and system management interrupts (SMIs)). Some of these fault events are "privileged" because they must be handled by the VMM 112 to ensure proper operation of VMs 102 and 114 and for protection from and among guest software.

When a privileged fault event occurs or guest software attempts to access a privileged resource, control may be transferred to the VMM 112. The transfer of control from guest software to the VMM 112 is referred to herein as a VM exit. After facilitating the resource access or handling the event appropriately, the VMM 112 may return control to guest software. The transfer of control from the VMM 112 to guest software is referred to as a VM entry.

In one embodiment, processors 118 and/or 119 control the operation of the VMs 102 and 114 in accordance with data stored in a virtual machine control structure (VMCS) 125. The VMCS 125 is a structure that may contain state of guest software, state of the VMM 112, execution control information indicating how the VMM 112 wishes to control operation of guest software, information controlling transitions between the VMM 112 and a VM, etc. Processor 118 and/or 119 read information from the VMCS 125 to determine the execution environment of the VM and to constrain its behavior. In one embodiment, the VMCS is stored in memory 120. In some embodiments, multiple VMCS structures are used to support multiple VMs.

During address translation operations, the VM 102 or 114 expects to allocate physical memory, provide protection from and between guest software applications (e.g., applications 108 or 110), use a variety of paging techniques, etc. In a non-virtual machine environment, an address translation mechanism expected by an OS may be based on a translation lookaside buffer (TLB) controlled by a processor and a translation data structure, such as a page-table (PT) hierarchy, controlled by the OS and used to translate virtual memory addresses into physical memory addresses when paging is enabled. Processors 118 and 119 include TLBs 122 and 123, respectively, for storing virtual to physical memory address translations.

The architecture of the Intel® Pentium® 4 Processor supports a number of paging modes. The most commonly used paging mode supports a 32-bit linear address space using a two-level hierarchical paging structure (referred to herein as a two-level hierarchy paging mode). Embodiments of the invention are not limited to this paging mode, but instead may be employed by one skilled in the art to virtualize other paging modes (e.g., Physical Address Extension (PAE) mode, Intel® Extended Memory 64 Technology (EM64T) mode, etc.) and implementations (e.g., hashed page tables). In one embodiment based on a TLB, translation of a virtual memory address into a physical memory address begins with searching the TLB using either the upper 20 bits (for a 4 KB page frame) or the upper 10 bits (for a 4 MB page frame) of the virtual address. If a match is found (a TLB hit), the upper bits of a physical page frame that are contained in the TLB are conjoined with the lower bits of the virtual address to form a physical address. The TLB also contains access and permission attributes associated with the mapping. If no match is found (a TLB miss), the processor consults the PT hierarchy to determine the virtual-to-physical translation, which is then cached in the TLB. Entries in the PT hierarchy may include some attributes that are automatically set by the processor on certain accesses.

If the PT hierarchy is modified, the TLB may become inconsistent with the PT hierarchy if a corresponding address translation exists in the TLB. The OS may expect to be able to resolve such an inconsistency by issuing an instruction to the processor. For example, in the Intel® 64 instruction set architecture (ISA), a processor allows software to invalidate cached translations in the TLB by issuing the INVLPG instruction. In addition, the OS may expect to request the processor to change the address space completely, which should result in the removal of all translations from the TLB. For example, in the Intel® 64 ISA, an OS may use a MOV instruction or a task switch to request a processor to load CR3 (which contains the base address of the PT hierarchy), thereby removing all translations from the TLB. Different levels of the page table hierarchy may have different names based upon mode and implementation. In the two-level hierarchy paging mode, there are two levels of paging structures. The CR3 register points to the base of the page directory page. Entries in the page directory may either specify a mapping to a large-size page (e.g., a 4 MB superpage, a 2 MB superpage, 1 GB superpage, etc.), or a reference to a page table. The page table in turn may contain mappings to small-size pages.

As discussed above, in the virtual-machine environment, the VMM 112 should be able to have ultimate control over physical resources including the TLBs. Embodiments of the present invention address the conflict between the expectations of guest software running in VMs 102 and 114 and the role of the VMM 112 by using a virtual TLB that emulates the functionality of the processor's physical TLB.

The virtual TLB includes the physical TLB and a set of shadow PT hierarchies controlled by the VMM 112. The set of shadow PT hierarchies derive its format and content from guest PT hierarchies that may be currently used or not used by the VM 102 or 114. If the VM 102 or 114 modifies the content of the guest PT hierarchies, this content becomes inconsistent with the content of the shadow PT hierarchies. The inconsistencies between the guest PT hierarchies and the shadow PT hierarchies are resolved using techniques analogous to those employed by a processor in managing its physical TLB. Some of these techniques force the VM 102 or 114 to issue an event indicating an attempt to manipulate the TLB (e.g., INVLPG, page fault, and load CR3). Such events are privileged and, therefore, result in a VM exit to the VMM 112. The VMM then evaluates the event and synchronizes all maintained shadow PT hierarchies with the current guest state if needed. We will refer to the set of maintained shadow PT hierarchies as the working set. As multiple processes may use the same guest page table, it is possible for the same shadow PT to be a part of multiple guest PT hierarchies. The corresponding shadow PT will in turn be a member of multiple shadow PT hierarchies.

Note that synchronization performed by the VMM may update shadow page table or page directory entries for a shadow PT hierarchy that is not currently in-use. Likewise synchronization may be required to guest pages that are not part of the in-use guest PT hierarchy.

In one embodiment, the VMM 112 includes an address translation module 126 that is responsible for creating and maintaining a working set of shadow PT hierarchies for each of the VMs 102 and 114 in a virtual TLB (VTLB) data store 124. The working set of shadow PT hierarchies is maintained for corresponding active processes of the VM 102 or 114 (i.e., processes that are likely to be activated in the near future by the VM 102 or 114). With the Intel® 64 ISA, the only explicitly defined guest hierarchy is that defined by the currently used paging structures. In practice there is a high deal of temporal locality for guest processes and their address spaces. The VMM may employ heuristics or explicit information to determine a set of active process.

When the VM 102 or 114 enables a guest PT hierarchy for one of the active processes of the VM 102 or 114, the address translation module 126 identifies a corresponding shadow PT hierarchy in the working set and requests the processor to load its base address. When applicable, the address translation module 126 can then reuse previously computed mappings that are stored in the shadow PT hierarchies.

If the VM 102 or 114 activates a new process, the address translation module 126 derives a new shadow PT hierarchy from a corresponding guest PT hierarchy and adds it to the working set. Alternatively, if the VM 102 or 114 de-activates an existing process, the address translation module 126 removes information corresponding to the guest PT hierarchy from the working set.

In one embodiment, the address translation module 126 is responsible for extracting metadata from each new shadow PT hierarchy, storing the metadata in the VTLB data store 124, and updating the metadata when the shadow PT hierarchy is modified. In one embodiment, the metadata includes a PT vector (PTV), a PD vector (PDV), an active PTE list, and an active PDE list.

The PTV and PDV track the guest frames that are used as PTs and PDs. In one embodiment, this information is encoded in bit vectors. The PTV may be indexed by page frame number (PFN), with each entry bit being set if a corresponding PFN is a PT. The PDV may be indexed by a page frame number (PFN), with each entry bit being set if a corresponding PFN is a PD.

The active PTE list is a list of PT entries (PTEs) in the shadow PT hierarchy that point to frames holding PTs and PD. The active PDE list identifies PD entries (PDEs) in the shadow PT hierarchy that point to PTs containing PT entries identified in the active PTE list.

In one embodiment, active PDE and PTE lists contain additional metadata describing whether the mapping is to a PD or PT frame.

One skilled in the art will understand that embodiments of this invention may use a variety of data structures which may be more or less space or time efficient than those described herein. One skilled in the art will also recognize the extension of tracking structures to support additional paging modes. For example, an EM64T paging mode maps a 64-bit virtual address to a physical address through a four-level hierarchical paging structure. The actual number of bits supported in the virtual or physical address spaces may be implementation dependent and may be less than 64 bits in a particular implementation. As will be discussed in more detail below, an EM64T implementation may require additions of a page-map level 4 (PML4) page vector and a page directory pointer (PDP) page vector to track the additional page tables used in the EM64T paging structure. Likewise, one skilled in the art will recognize that the active PTE list will be extended to include entries which map any page used within the paging structures (e.g., PML4 or PDP pages for EM64T).

In one embodiment, active PTE/PDE list metadata is maintained to track the number of PD and PT frames that are mapped through a page table. When the number of mappings per page is incremented from 0, then PDEs which map the PT must be added to the active PDE list, and when the number of mappings is decreased to zero, then PDEs that map this PT must be removed from the active PDE list.

In one embodiment, the address translation module 126 is responsible for synchronizing a current shadow PT hierarchy with a current guest PT hierarchy when such synchronization is needed. The address translation module 126 performs the synchronization by determining which entries in the guest PT hierarchy have recently been modified and then updating corresponding entries in the shadow PT hierarchy accordingly. The address translation module 126 determines which entries in the guest PT hierarchy have recently been modified based on the metadata extracted from the shadow PT hierarchy and attributes associated with the entries of the shadow PT hierarchy. In one embodiment, the attributes include access attributes associated with PD entries in the shadow PT hierarchy and update attributes associated with PT entries in the shadow PT hierarchy.

Figure 2:
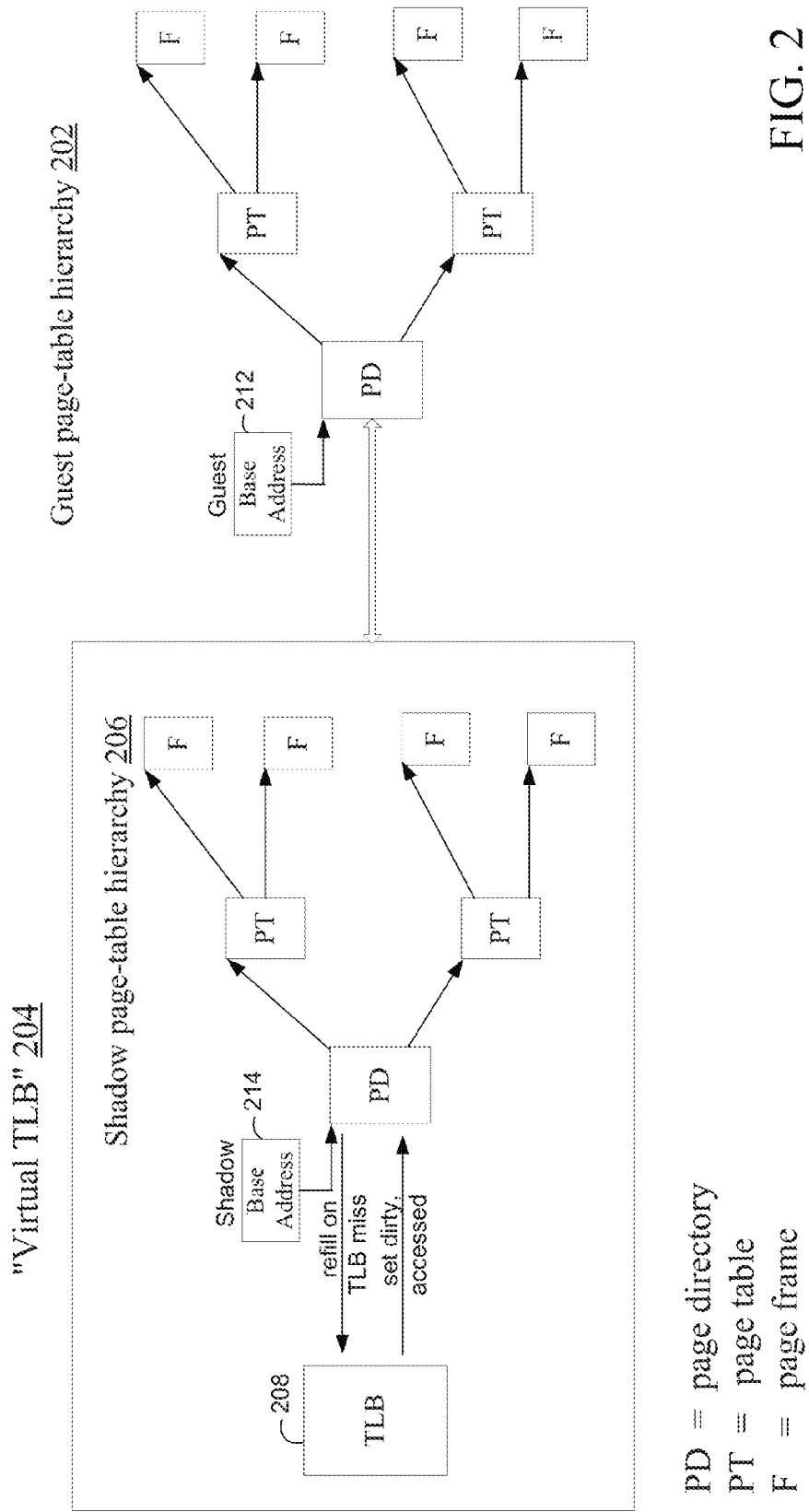
FIG. 2 illustrates operation of a virtual TLB, according to one embodiment of the present invention.

FIG. 2 illustrates operation of a virtual TLB 204, according to one embodiment of the present invention. Virtual TLB 204 includes a shadow translation data structure represented by a shadow PT hierarchy 206 and a physical TLB 208. The shadow PT hierarchy 206 derives its structure and content from a guest translation data structure represented by a guest PT hierarchy 202. In one embodiment, the VMM maintains a working set of shadow PT hierarchies for active processes of the VM.

In one embodiment, when the VM requests the processor to enable a different guest PT hierarchy (e.g., by issuing MOV to CR3 or task switch in the Intel® 64 ISA), control transitions to the VMM, which instructs the processor to load the base address 214 of a shadow PT hierarchy 206 corresponding to the requested guest PT hierarchy 202. In some embodiments, this shadow PT hierarchy 206 is synchronized with the guest PT hierarchy 202 using relevant metadata and attributes, as will be discussed in greater detail below.

In one embodiment, the virtual TLB maintains access and update attributes in the entries of the shadow PD and PTs. These attributes are also referred to as an accessed (A) bit and a dirty (D) bit. In one embodiment, when a page frame is accessed by guest software for the first time, the processor sets the accessed (A) attribute in the corresponding PT entry or PD entry in the shadow PT hierarchy 206. If guest software attempts to write a page frame, the processor sets the dirty (D) attribute in the corresponding shadow PT entry.

Guest software may be allowed to freely modify the guest PT hierarchy 202 including changing virtual-to-physical mapping, permissions, etc. Accordingly, the shadow PT hierarchy 206 may not be always consistent with the guest PT hierarchy 202. When a problem arises from an inconsistency between the hierarchies 202 and 206, the guest OS, which treats the virtual TLB 204 as a physical TLB, attempts to change the virtual TLB 204 by requesting a processor to perform an operation defined by a relevant ISA. For example, in the Intel® 64 ISA, such operations include the INVLPG instruction, CR3 loads, paging activation (modification of CR0.PG), modification of global paging (toggling of the CR4.PGE bit), etc. Operations that force consistency between guest page tables and the virtual TLB 204 are configured by the VMM as privileged (e.g., using corresponding execution controls stored in the VMCS), and, therefore, result in a VM exit to the VMM. The VMM then determines the cause of the VM exit and modifies the content of the shadow PT hierarchy 206 if necessary. For example, if the VM exit occurs due to a page fault that should be handled by the guest OS (e.g., a page fault caused by an access not permitted by the guest PT hierarchy 202), the page fault is injected to the guest for handling. Alternatively, if the VM exit occurs due to a page fault (or any other operations such as INVLPG) resulting from an inconsistency between the entries of the hierarchies 202 and 206, the VMM may need to remove stale entries, add new entries, or modify existing entries, as will be discussed in more detail below. Page faults caused by the guest PT hierarchy are referred to herein as 'real' page faults, and page faults that would not have occurred with direct usage of the guest page tables are referred to herein as 'induced' page faults.

Figure 3A:
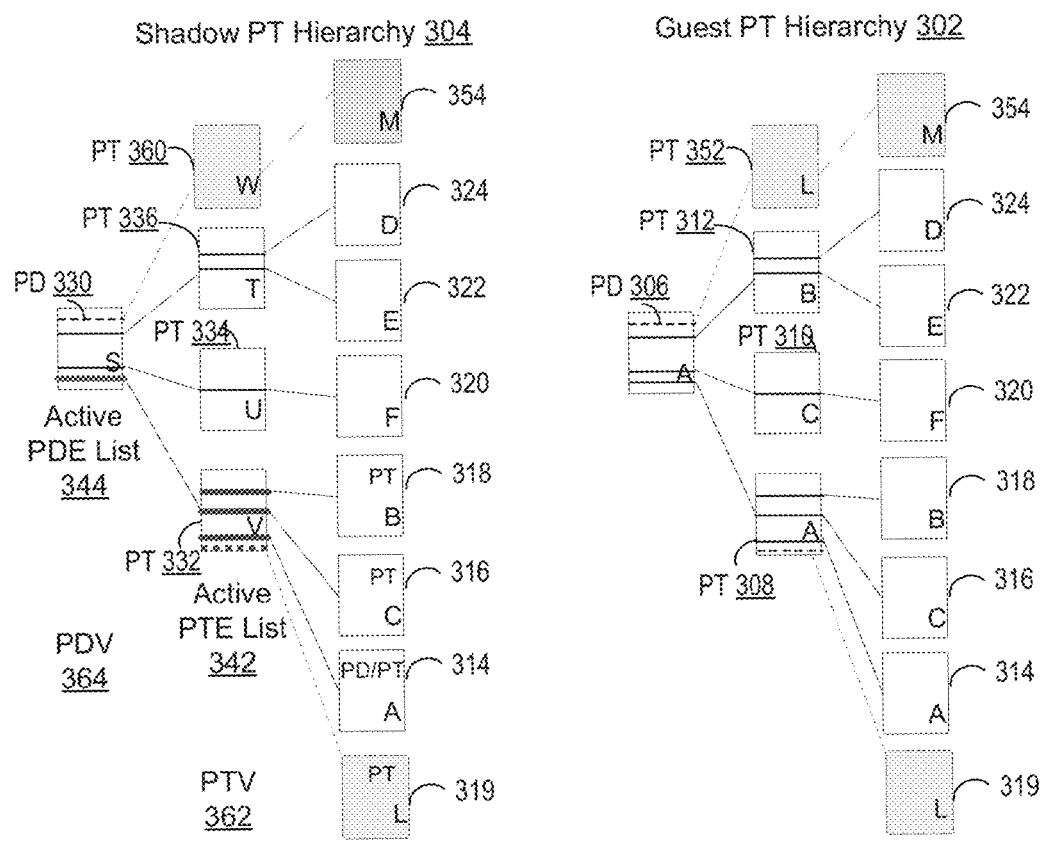
FIGS. 3A and 3B illustrate a process of creating and maintaining metadata for a shadow PT hierarchy, according to two alternative embodiments of the present invention.

FIG. 3A illustrates a process of creating and maintaining metadata for a shadow PT hierarchy in a two-level hierarchy paging mode, according to one embodiment of the present invention.

Referring to FIG. 3A, a number of physical page frames identified by distinct letters (letters A through W) is illustrated. Some guest page frames may contain a PD (e.g., frame A). Other guest page frames may contain a PT (e.g., frames A, B, C, and L). A hierarchy 302 is a guest PT hierarchy.

FIG. 3A shows a shadow PT hierarchy 304 created based on a guest PT hierarchy 302. Each PD or PT in the guest PT hierarchy 302 includes a corresponding PD or PT in the shadow PT hierarchy 304. Note that in general a shadow page is not required for each page in the guest PT. Some embodiments may choose to restrict shadow pages according to usage statistics (e.g., only generate shadow pages for guest PT pages that have been used), or according to resource constraints (e.g., maintaining only a set of shadow pages based on available memory). Separate shadow tables are maintained for PD and PT tables derived from the same physical frame. For example, separate tables 330 and 332 are maintained for PD 306 and PT 308 that are derived from the same physical frame 314. The PD and PT entries in the shadow PT hierarchy 304 contain transformed mappings for the guest frames 314 through 324.

In the guest PT hierarchy 302, frames 316 and 318 are used as PTs 310 and 312, and frame 314 is used both as PD 306 and PT 308. This usage is illustrated as "PT" and "PD/PT" in the page frames 314 through 316 shown under the shadow PT hierarchy 304.

The shadow PT hierarchy 304 is associated with an active PTE list 342 and an active PDE list 344. In one embodiment, the active PIE list 342 identifies PT entries in the shadow PT hierarchy 304 that map PT and PD page frames from the guest PT hierarchy 302. In particular, the active PTE list 342 identifies entries in the PT 332 that map page frames 314 through 318. In one embodiment, the active PDE list 344 identifies PD entries in the shadow PT hierarchy that point to PTs with entries identified in the active PTE list 342. In particular, the active PDE list 344 includes entries in the PD 330 that point to the PT 332. The active PTE list 342 and the active PDE list 344 are components of the metadata of the shadow PT hierarchy 304.

The shadow PT hierarchy 304 is associated with a PT hit vector (PTV) 362 and a PD bit vector (PDV) 364. In one embodiment, the PTV 362 tracks the guest page frames that are used as PTs. In particular, the PTV 362 includes page frames 314 through 318 which are used as PTs in the guest PT hierarchy 302. In one embodiment, the PDV 364 tracks the guest page frames that are used as PDs. In particular, the PDV 364 includes page frame 314 that is used as PD in the guest PT hierarchy 302. In one embodiment, the PTV 362 and PDV 364 represent all shadow PT hierarchies in the working set and track the capacity in which shadow pages are employed in the working set (e.g., if a shadow page has not been allocated for a guest PT, then the PTV will not reflect the guest PT page, even if it appears in the guest paging structures).

In one embodiment, if the guest OS adds a new PT to the guest PT hierarchy 302, the VMM may detect this addition (e.g., on the next or subsequent VM exit related to TLB manipulation) and add a corresponding PT to the shadow PT hierarchy 304. For example, if a new PT 352 derived from a frame 319 is added to the guest PT hierarchy 302, with a mapping for a new frame 354, the VMM may add a corresponding PT 360 with transformed mappings to the shadow PT hierarchy 304 and update the metadata to reflect this change. In particular, the VMM adds an entry mapping frame 319 in the PT 332 to the active PTE list 342, and an entry pointing to the PT 360 in the PD 330 to the active PDE list 344. Also, the VMM adds frame 319 to PTV 362, which tracks guest frames (i.e., here frame 319) used as PTs.

Figure 3B:
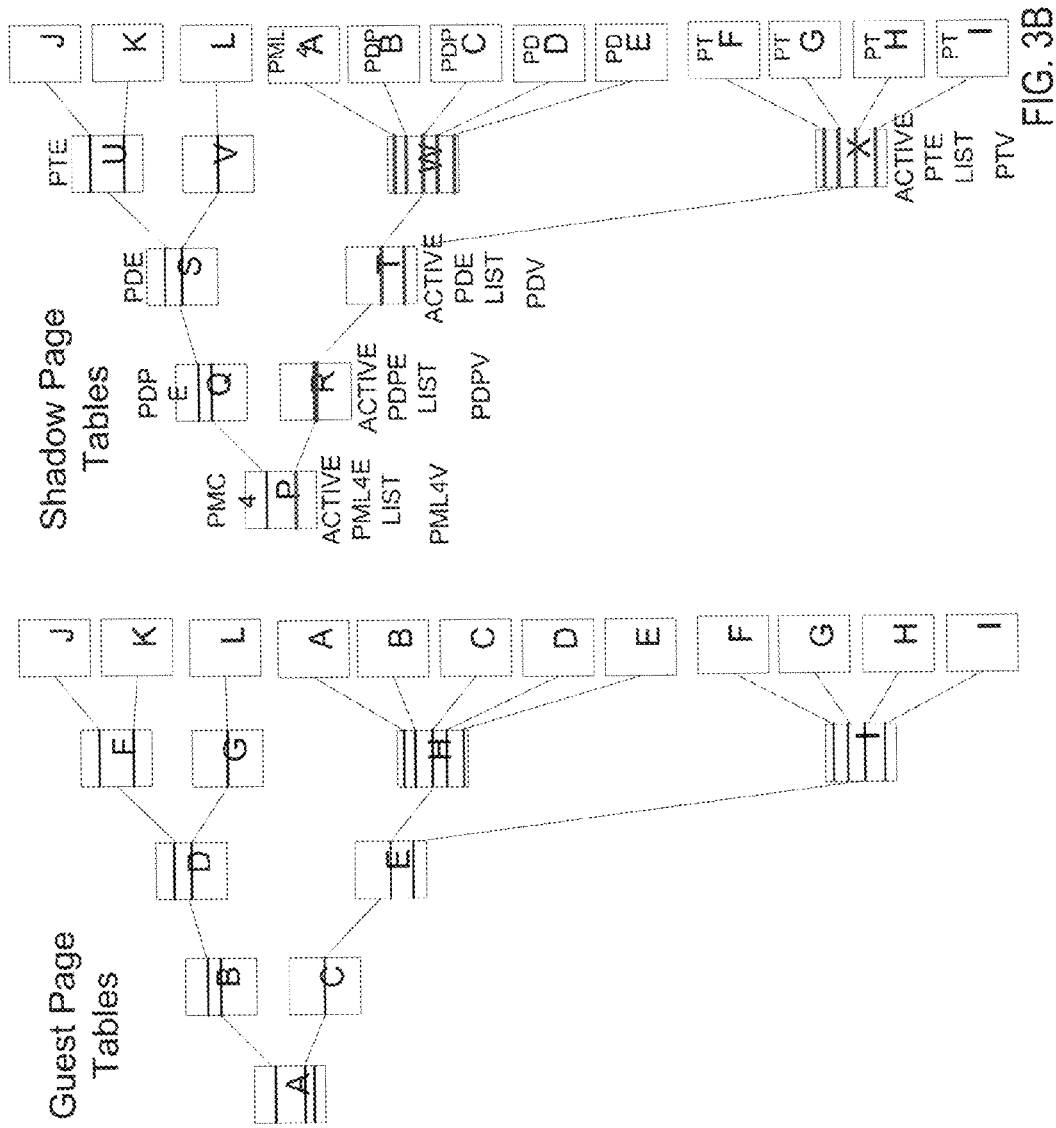

FIG. 3B illustrates a process of creating and maintaining metadata for a shadow PT hierarchy in the EM64T paging mode, according to one embodiment of the present invention.

Referring to FIG. 3B, the base of the paging structure is a PML4 page (e.g., frame A). Each entry in the PML4 page may reference a PDP page (e.g., frames B and C). Each entry in the PDP page may reference a page directory (PD) page (e.g., frame D or E), each entry of which in turn may reference a page in a page table (PT) page (e.g., frame F, G, H or I).

Each PML4, PDP, PD or PT page may be 4 KB in size. In order to support physical address spaces larger than 32 bits, the entry size may be increased relative to the 32-bit paging mode. Specifically, there may be 512 entries per page, requiring that 9 bits of the virtual address be used at each level to select the appropriate entry. This selector size may lead to a large page size of 2 MB instead of 4 MB as described previously. In such hierarchies, various large-page sizes may be supported at other levels of the hierarchy (e.g., 1 GB pages may be specified in PDP entries).

In one embodiment, the creation of metadata in the EM64T paging mode includes the generation of several vectors, an active entry list, and several active directory lists. The vectors include a PML4V vector identifying frames used as PML4 pages, a PDPV vector identifying frames used as PDP pages, a PDV vector identifying frames used as PD pages, and a PTV vector identifying frames used as PT pages. The active entry list is an active PTE list including all mappings which map a PML4, PDP, PD or PT page. The active directory lists include lists identifying higher level mapping structures referencing a lower level structure through which the guest page corresponding to a shadow structure can be accessed. In particular, the active directory lists consist of an active PDE list including those PDEs that reference a page containing active PTE list entries, an active PDPE list including active PDPE entries which reference a PD containing an active PDE list entry, and an active PML4E list including entries which map a PDP containing elements in the active PDPE list.

In one embodiment, the synchronization of the shadow page tables begins with checking each entry in the active PML4E list associated with the used shadow PT hierarchy. If the entry has been accessed, each element in the active PDPE list corresponding to the accessed PML4 entry is checked, and then the processing continues as previously described.

In an alternative embodiment, active lists are not maintained and/or processed for one or more of the upper levels of the hierarchy. For example, in a system in which only a single entry is populated in the uppermost paging structure, the use of an active list for each level of the hierarchy will cause this single entry to be always accessed, thereby allowing no reduction in the amount of processing required for lower levels in the hierarchy. To accommodate this usage model, the synchronization may instead begin by processing an active list lower in the hierarchy. For example, in one embodiment, active PDPE list elements may first be processed followed by active PDE list elements or active PTE list elements associated with a used shadow PT hierarchy. In one embodiment, the initial layer processed on synchronization may be predetermined. In another embodiment, the initial layer to be processed may be determined by dynamic profiling of the guest's page table usage.

Various other paging modes may be used with embodiments of the present invention. For example, the Intel® 64 ISA supports an additional paging mode in which a 32-bit virtual address is mapped to a larger physical address. In this additional mode of operation, the page table base register is configured to point to a PDP page which contains four elements. Entry sizes and behaviors in this additional mode of operations are similar to those described above for the 64-bit virtual address mode. As this additional mode does not make use of PML4 pages, the PML4V and active PML4E list are not required.

Figure 4:
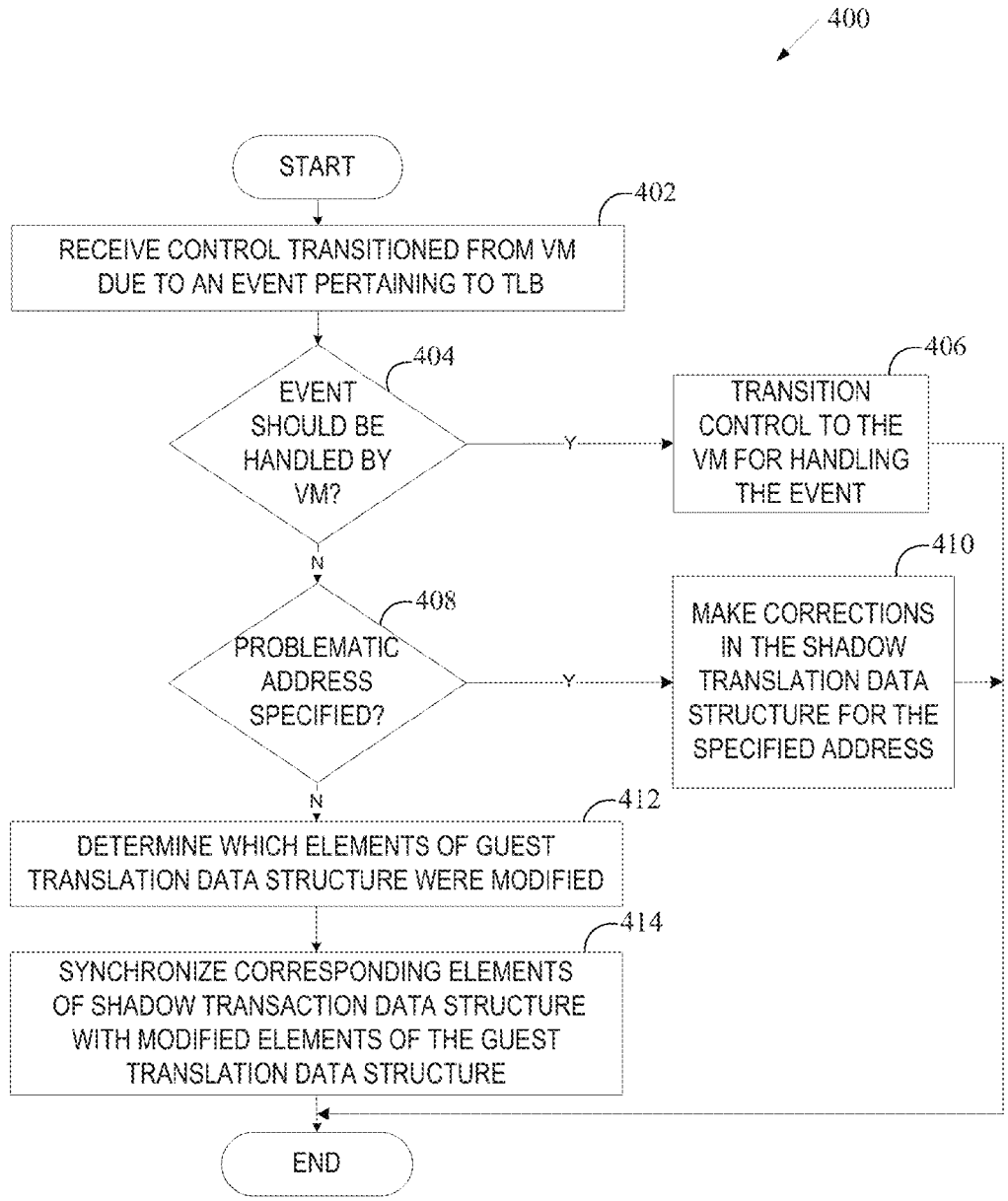
FIG. 4 is a flow diagram of one embodiment of a process for synchronizing guest translation data structure and shadow translation data structure.

FIG. 4 is a flow diagram of one embodiment of a process 400 for synchronizing a guest translation data structure and a shadow translation data structure. The process may be performed by processing logic that may comprise hardware (e.g., dedicated logic, programmable logic, microcode, etc. software (such as that run on a general purpose computer system or a dedicated machine), or a combination of both. In one embodiment, the process is performed by an address translation module 126 of FIG. 1.

Referring to FIG. 4, process 400 begins with processing logic receiving control transitioned from a VM due to an event pertaining to manipulation of the TLB (processing block 402). Examples of such events may include a request to change the current address space (e.g., CR3 load), a request to adjust inconsistent translations for a specified virtual address in the TLB (e.g., INVLPG), a page fault, etc.

At processing block 404, processing logic determines whether the event pertaining to the manipulation of the TLB should be handled by the VM. If so (e.g., the event is a page fault caused by a problematic mapping in a guest translation data structure), control is returned to the VM for handling the event (processing block 406). If not, processing logic determines whether the event is associated with specified problematic address (processing block 408).

If the event does not need to be handled by the VM, it may be associated with a specified problematic address. Examples of such an event may include an event caused by the INVLPG instruction that takes a problematic address as an operand, an event caused by an induced page fault (e.g., a page fault resulting from an inconsistency between the two translation data structures with respect to a specific mapping, a page fault caused by a need to virtualize A/D bits in the guest translation data structure, etc.), etc. If the event is associated with a specified problematic address, processing logic makes corrections in the shadow translation data structure for the specified address (e.g., removes a stale mapping for the specified address or adds a new mapping for the specified address) to conform to the guest translation data structure (processing block 410). One embodiment of a process for synchronizing entries of two translation data structures for a specified address is discussed in more detail below in conjunction with FIG. 7.

If the event is not associated with any specific address (e.g., the event is caused by a request of the VM to change the address space, which flushes all TLB entries in the Intel® 64 ISA), processing logic determines which entries of the guest translation data structure have been modified (processing block 412). The determination is made using metadata extracted from the shadow translation data structure and attributes associated with the entries of the shadow translation data structure (processing block 412). The metadata includes vectors and active lists for various levels of the shadow translation data structure. A vector for a specific level of the shadow translation data structure identifies flames used as pages at this level of the guest translation data structure. The active lists include an active entry list and one or more active directory lists. The active entry list includes mappings that map pages used by the guest in forming the guest translation data structure. The active directory lists identify higher level mapping structures referencing a lower level structure through which a guest page corresponding to a shadowed paging structure can be accessed. As discussed above, in the two-level hierarchy paging mode, the metadata includes, in one embodiment, vectors PTV and PDV, an active entry list (a PTE list), and an active directory list (a PDE list). In the EM64T paging mode, the metadata includes, in one embodiment, vectors PTV, PDV, PDPV and PML4V, an active entry list (a PTE list), and active directory lists (an active PDE list, an active PDPE list and an active PML4E list).

One embodiment of a process for identifying recently modified entries of the guest translation data structure using metadata is discussed in more detail below in conjunction with FIG. 6.

At processing block 414, processing logic synchronizes corresponding entries in the shadow translation data structure with the modified entries of the guest translation data structure. Accordingly, processing logic only needs to synchronize the entries that were modified, rather than re-populating the entire content of the shadow translation data structure.

In one embodiment extra storage is used to maintain some guest PD and/or PT contents as they were last synchronized. This permits the VMM to determine where modifications have been made without calculating or looking up additional relocation or permission information.

Note that certain modifications to the guest page tables do not require modifications to the shadow page tables. For example, if a guest PT contains a not present mapping which is subsequently modified, no change is required to the corresponding shadow PT. In an embodiment, synchronization may include eagerly populating mappings for entries that had not been present which are modified to present.

FIGS. 5-14 illustrate various processes performed to support address translation in a virtual machine environment using the two-level hierarchy paging mode, according to different embodiments of the present invention. These processes may be performed by processing logic that may comprise hardware (e.g., dedicated logic, programmable logic, microcode, etc.), software (such as that run on a general purpose computer system or a dedicated machine), or a combination of both. In one embodiment, each of these processes is performed by an address translation module 126 of FIG. 1.

Figure 5:
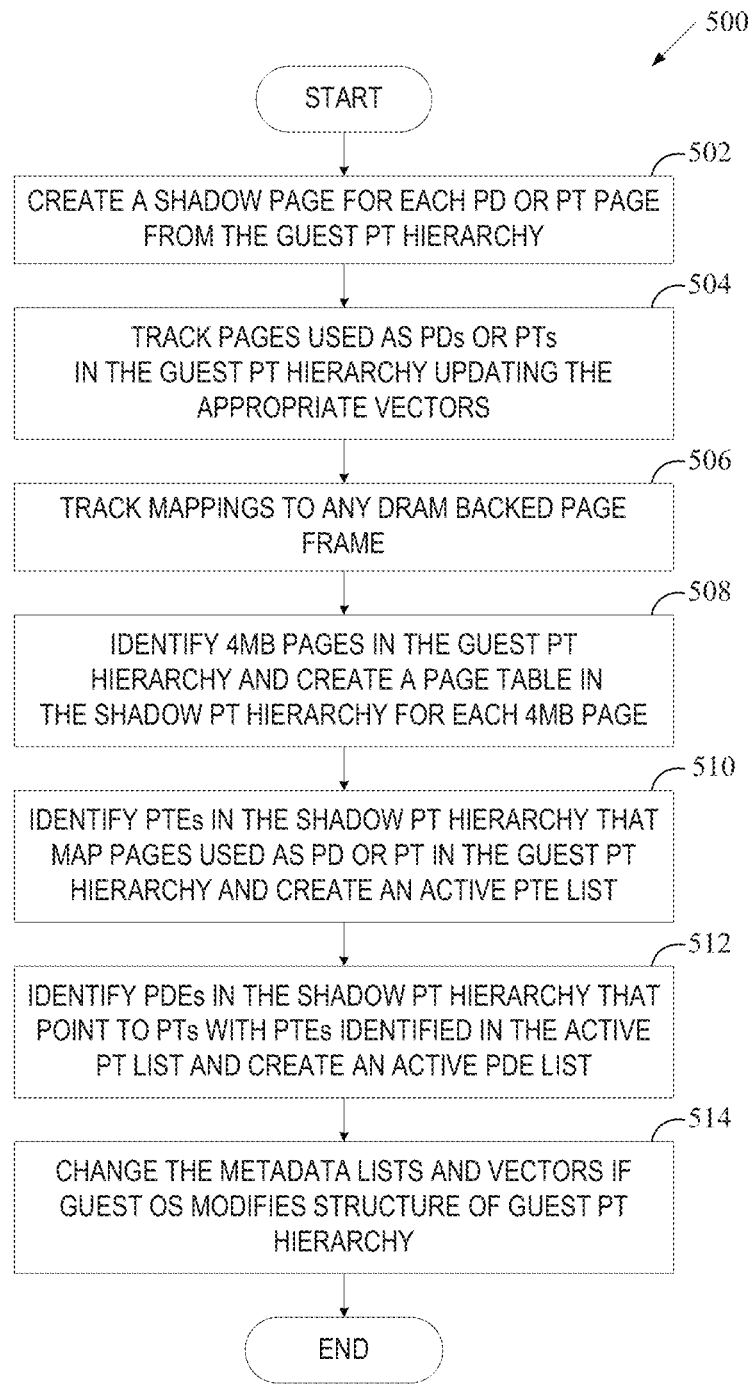
FIG. 5 is a flow diagram of one embodiment of a process for maintaining metadata for a shadow translation data structure.

FIG. 5 is a flow diagram of one embodiment of a process 500 for maintaining metadata for a shadow translation data structure such as a shadow PT hierarchy.

Referring to FIG. 5, process 500 begins with processing logic creating a shadow page for each PD or PT page from the guest PT hierarchy (processing block 502).

At processing block 504, processing logic tracks page frames used as PDs or PTs in the guest PT hierarchy. In one embodiment, processing logic sets an entry in the PDV if a corresponding PFN is a PD in the guest PT hierarchy. Similarly, processing logic sets an entry in the PTV if a corresponding PFN is a PT in the guest PT hierarchy.

At processing block 506, processing logic tracks mappings to any Dynamic Random Access Memory (DRAM) backed page (to identify pages that can potentially be PDs or PTs). In one embodiment, processing logic tracks mappings to DRAM based pages using an inverted page table (IPT) and an inverted page directory (IPD). The IPT is indexed by a PFN of a data page frame, with each entry containing a list of addresses of PTEs that map the data page frame. The IPD is indexed by a PEN of the page table, with each entry containing a list of addresses of PDEs that reference the PFN as a page table.

In one embodiment, at processing block 508, processing logic identifies 4 MB pages in the guest PT hierarchy and creates a page table in the shadow PT hierarchy for each 4 MB page to avoid large page mappings and thereby reduce future synchronization time. Otherwise, an update of a 4 MB page would cause the synchronization of every PD and PT page within the 4 MB. In one embodiment, an inverted expansion table (IET) is used to track which PDEs in the guest PT hierarchy point to a 4 MB page. The IET is indexed by a PFN and attribute bits, with every entry listing PDEs that point to the exploded 4 MB page. Similar treatment may be done to support large pages of other sizes. In an embodiment, large pages are replaced with corresponding mappings only when at least one paging-structure page would be mapped by the large page.

In an embodiment of the invention the IPD may be indexed by the address of the shadow PFN to minimize required address translation steps.

In the Intel® 64 ISA, memory type information (e.g., cacheability information) can be stored in PAT bits within the PDE/PTE that maps a page. This type information is not captured in a PDE that is a page-table pointer. Hence, if two 4 MB pages were to map the same region with different PAT attributes, then separate page tables would be required to convey the correct PAT attributes. Using separate expansion tables for each set of attributes resolves this issue.

At processing block 510, processing logic identifies PTEs in the shadow PT hierarchy that map pages used as PD or PT in the guest PT hierarchy and creates an active PTE list.

At processing block 512, processing logic identifies PDEs in the shadow PT hierarchy that point to PTs with PTEs identified in the active PTE list and creates an active PDE list.

Subsequently, at processing block 514, if the guest OS modifies the structure of the guest PT hierarchy (e.g., adds or removes a PD or PT), processing logic changes the above active PTE and PDE lists accordingly.

Figure 6:
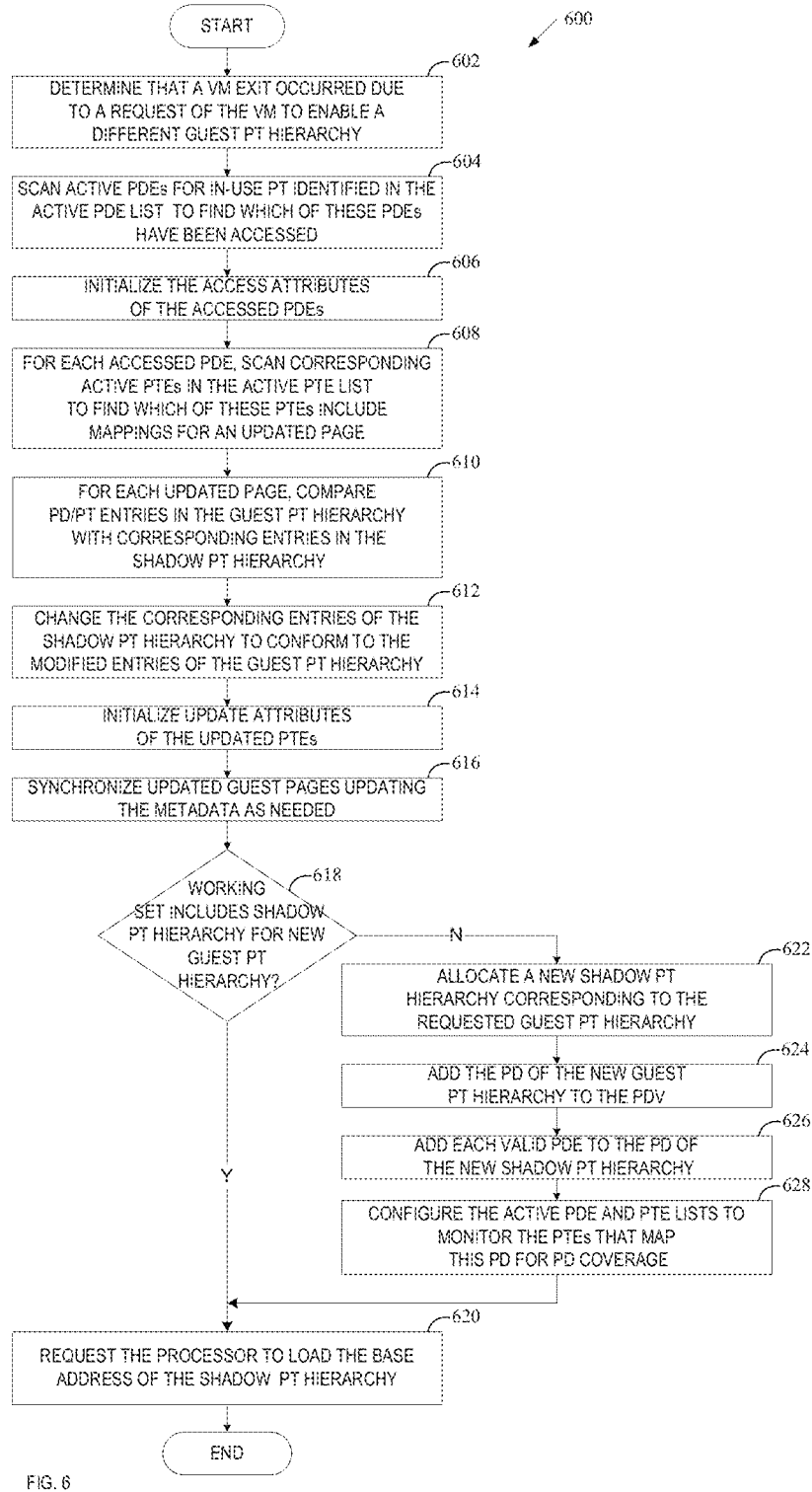
FIG. 6 is a flow diagram of one embodiment of a process for facilitating a change of an address space.

FIG. 6 is a flow diagram of one embodiment of a process 600 for facilitating a change of an address space. Note that in the Intel® 64 ISA the same CR3 value may also be reloaded to force a flush of stale TLB mappings. Similar processing steps are taken for a change of CR3 or for a CR3 reload.

Referring to FIG. 6, process 600 begins with processing logic determining that a VM exit occurred due to a request of the VM to enable a different guest PT hierarchy (e.g., by issuing a CR3 load request) (processing block 602).

In response, processing logic scans all active PDEs corresponding to the currently in-use shadow PT hierarchy identified in the active PDE list of the metadata to find which of these PDEs have been accessed (have an access attribute set to an access value) (processing block 604), and then initializes the access attributes of the accessed PDEs (processing block 606). In the Intel® 64 ISA, non-leaf paging tables do not support a dirty bit. If the accessed bit is clear, then no page within the 4 MB region has been read or written, so any guest page table or page directory cannot have been modified. However, the accessed bit does not distinguish between reads and writes, so 4 MB regions which have been accessed should be further processed even though it is possible that nothing has been modified, in architectures supporting a dirty bit for non-leaf page tables, the dirty bit is checked instead, and only regions which had been written to require further processing. In an other embodiment, using a monitoring approach with deprivileging instead of A/D bits, structures to be synchronized may be identified through faults on guest accesses.

Next, for each accessed PDE, processing logic scans all shadow PTEs corresponding to the accessed active PDE in the active PTE list of the metadata to find which of these PTEs include mappings for an updated page (have an update attribute set to an update value) (processing block 608).

Further, for each updated page, processing logic compares PD/PT entries in the guest PT hierarchy with corresponding entries in the shadow PT hierarchy (processing block 610) and changes the corresponding entries of the shadow PT hierarchy to conform to the modified entries of the guest PT hierarchy (e.g., by removing from the shadow PT hierarchy a PTE/PDE absent in the guest PT hierarchy, by adding to the shadow PT hierarchy a new PTE/PDE recently added to the guest PT hierarchy, etc.) (processing block 612). Note that adding PDE may require the allocation and initialization of additional shadow PTs. This in turn may require updates to the various metadata structures maintained by the address translation module 126.

At processing block 614, processing logic initializes update attributes that were set to an update value. Updated mappings identify the pages that were modified by the guest OS.

At processing block 616, processing logic synchronizes the shadow mappings based on modified guest pages and updates the metadata if needed due to the above modifications.

At processing logic 618, processing logic determines whether a working set maintained by the VMM includes a shadow PD corresponding to the new guest PD requested by the VM. If so, processing logic requests the processor to load the base address of this shadow PT hierarchy (processing block 620). If not, processing logic allocates a new shadow PT hierarchy corresponding to the requested guest PT hierarchy (processing block 622), adds the PD of the new shadow PT hierarchy to the PDV (processing block 624), adds each valid PDE to the PD of the new shadow PT hierarchy (processing block 626), configures the active PDE and PTE lists to monitor the PTEs that map this PD for PD coverage (processing block 628), and then requests the processor to load the base address of this shadow PT hierarchy (processing block 620). One embodiment of a process for monitoring a PTE is discussed in more detail below in conjunction with FIG. 13.

Figure 7:
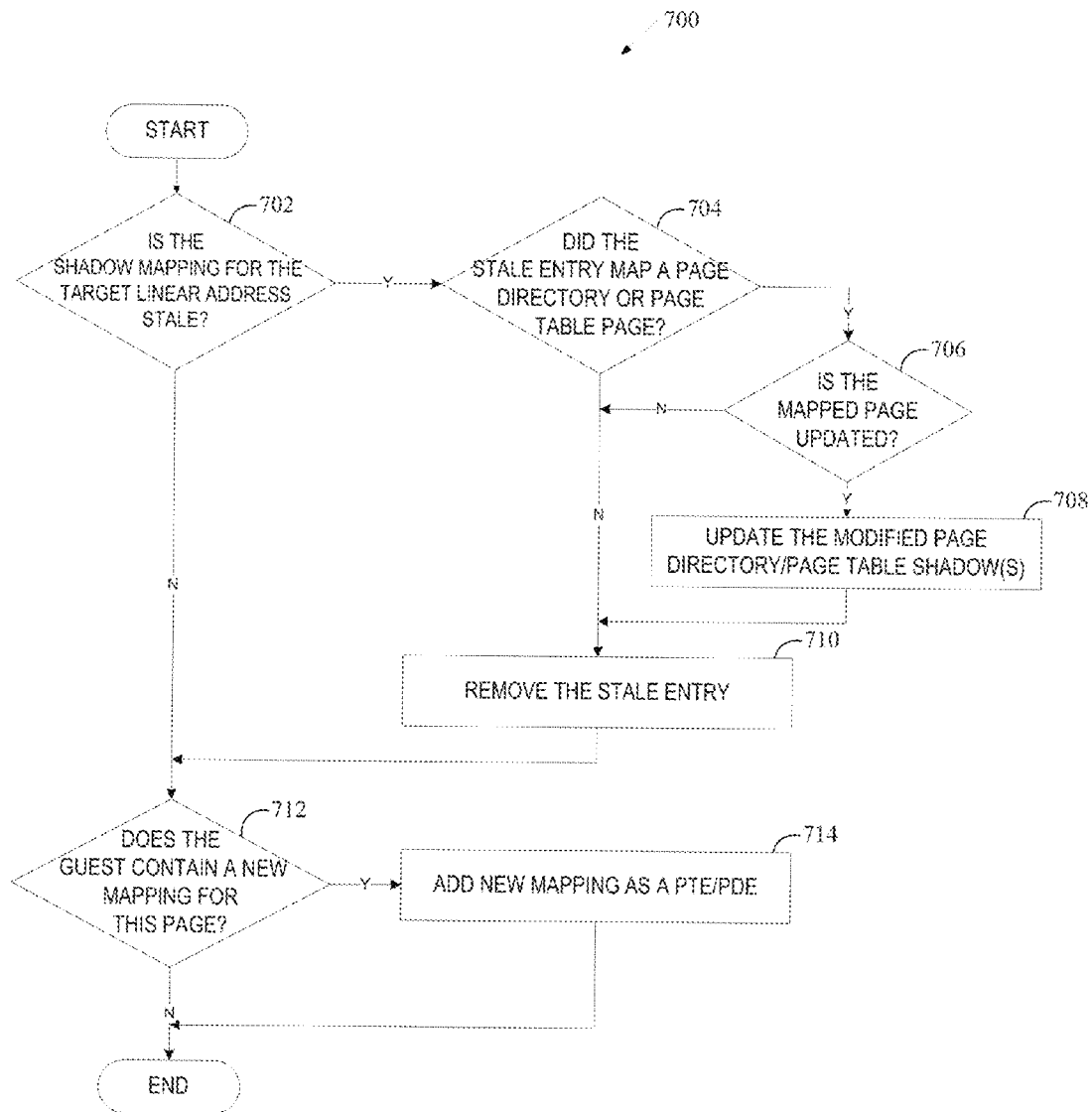
FIG. 7 is a flow diagram of one embodiment of a process for synchronizing entries of two translation data structures for a specified address.

FIG. 7 is a flow diagram of one embodiment of a process 700 for synchronizing entries of two translation data structures for a specified address. Process 700 may be performed, for example, as a result of the INVLPG instruction issued by the VM or as a result of an induced page fault.

Referring to FIG. 7, process 700 begins with processing logic determining whether the mapping in the shadow PT hierarchy for the specified address is stale (i.e., there is valid mapping that does not correspond to the current contents of the guest page table) (processing block 702). If not, processing logic proceeds to processing block 712. If so, processing logic determines whether the stale entry mapped a PD or PT page (processing block 704). If the stale entry did not map a PD or PT page, processing logic removes the stale entry (processing block 710) and proceeds to processing block 712.

If the stale entry did map a PD or PT page, processing logic further determines whether the mapped page has been updated (processing block 706). If not, processing logic proceeds to processing block 710. If so, processing logic updates, synchronizes, or removes the modified PD or PT shadow(s) (processing block 708) and proceeds to processing block 710. In one embodiment, the page is marked for future synchronization.

At processing block 712, processing logic determines whether the guest PT hierarchy contains a new mapping for the specified address. If not, process 700 ends. If so, processing logic adds the new mapping as a corresponding PTE or PDE and, if necessary, creates a shadow page and updates the metadata according to the addition (processing block 714).

Figure 8:
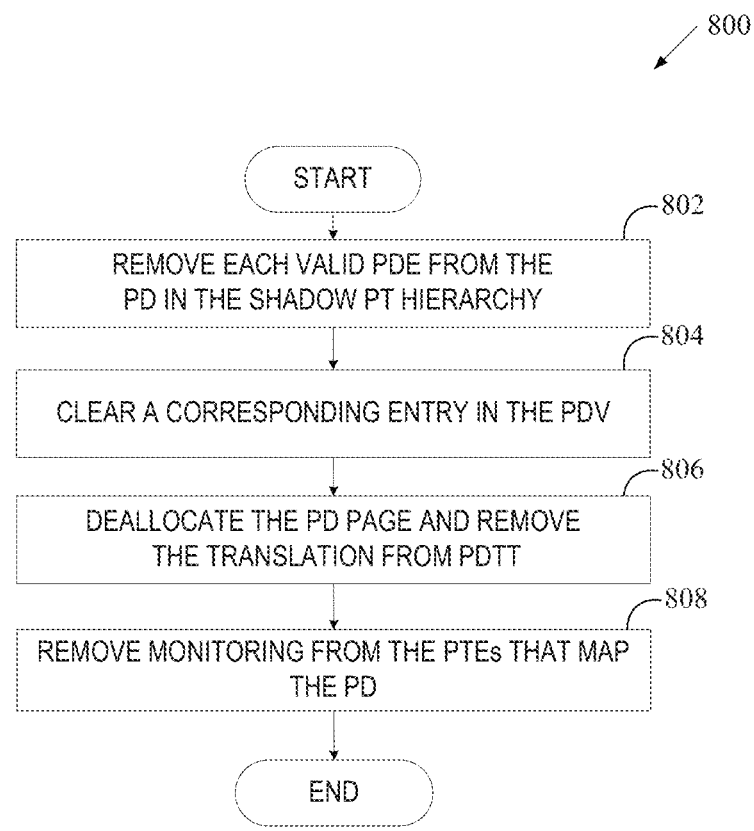
FIG. 8 is a flow diagram of one embodiment of a process for removing a shadow PT hierarchy from a working set of shadow PT hierarchies maintained by the VMM.

FIG. 8 is a flow diagram of one embodiment of a process 800 for removing a shadow PT hierarchy from a working set of shadow PT hierarchies maintained by the VMM.

A shadow PT hierarchy may be removed from the working set upon detecting a deactivation of a corresponding process by the VM. The deactivation may be detected using heuristic defined for a relevant OS or employing a set of checks based on clues provided by the behavior of the guest VM with respect to the current address space. If the VM supports an interface through which the OS or a driver notifies the VMM of deactivations, then a heuristic may be avoided. A shadow PT hierarchy may also be removed due to resource constraints, e.g., because the amount of memory used for shadow structures exceeds a target threshold.

Referring to FIG. 8, processing logic begins with removing each valid PDE from the PD in the shadow PT hierarchy (processing block 802).

At processing block 804, processing logic clears a corresponding entry in the PDV.

At processing block 806, processing logic deallocates the PD page and removes the translation from a PD translation table (PDTT). The PDTT is used to track the address and type (e.g., PD or PT) of a page. The PDTT is indexed by a guest PFN, with each entry containing a physical PFN and metadata.

At processing block 808, processing logic removes monitoring from the PTEs that map the PD. One embodiment of a process for removing monitoring from a PTE is discussed in more detail below in conjunction with FIG. 14.

Figure 9:
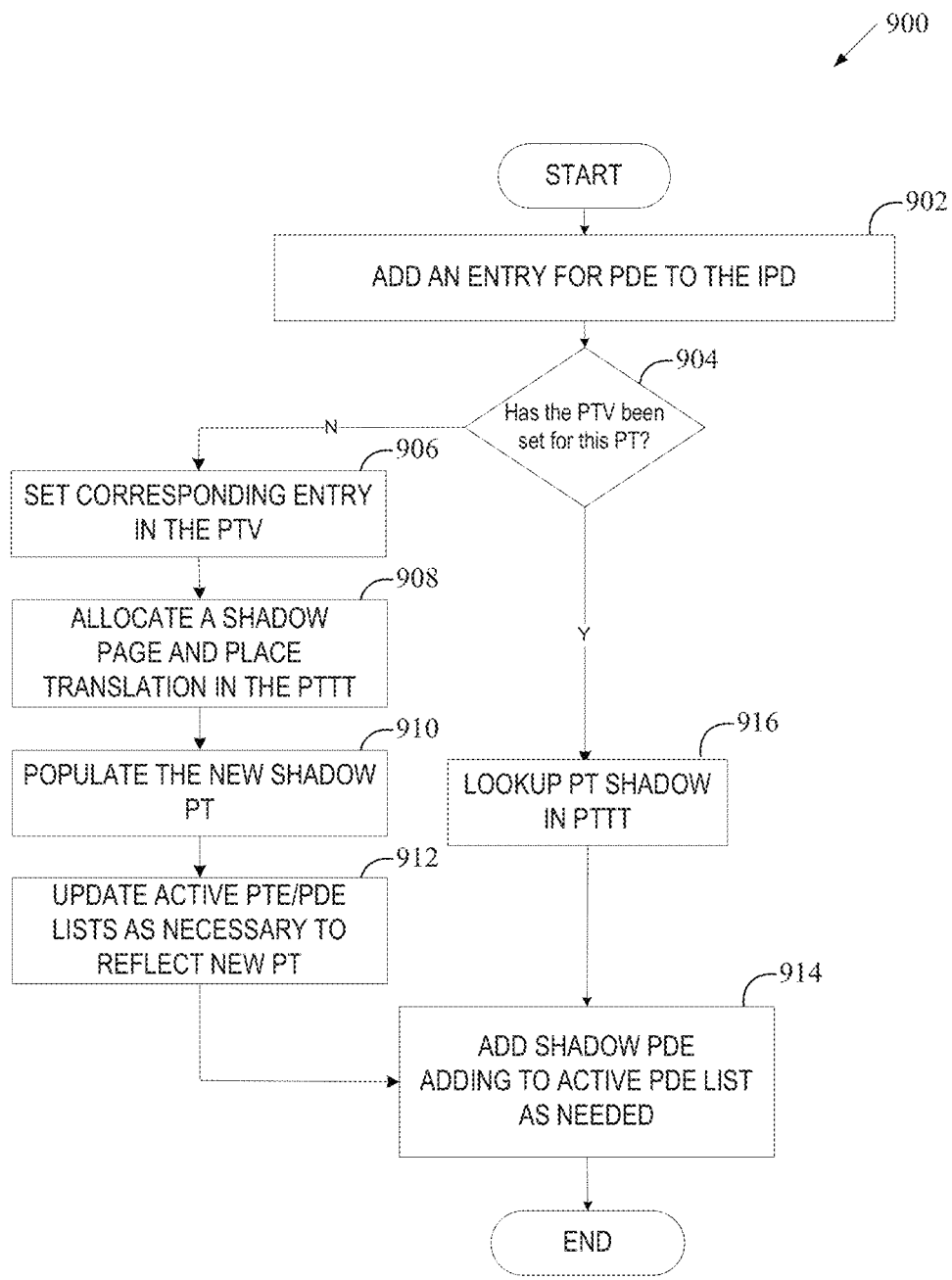
FIG. 9 is a flow diagram of one embodiment of a process for adding an entry to a PD of a shadow PT hierarchy.

FIG. 9 is a flow diagram of one embodiment of a process 900 for adding an entry to a PD of a shadow PT hierarchy. For illustration, we will consider a present entry which maps a page table.

Referring to FIG. 9, processing logic begins with adding an entry for the PDE to the IPD (processing block 902).

At processing block 904, processing logic determines if the PT mapped by this PDE is set in the PTV. If so, the appropriate shadow PT is looked up in the PTTT (processing block 916), the new shadow PDE is created (processing block 914) and process 900 ends. If not, processing logic sets a corresponding vector in the PTV (processing block 906), allocates a shadow page and initializes the translation (processing block 908), populates the new shadow page table (processing block 910), updates active PTE/PDE lists and metadata to reflect that the guest page used as a page table by the current guest PDE is to be monitored (processing block 912), and adds the new PDE, adding it to the active PDE list if the shadow page table contains any active PTE list elements (processing block 914). One embodiment of a process for monitoring a PTE is discussed in more detail below in conjunction with FIG. 13.

Figure 10:
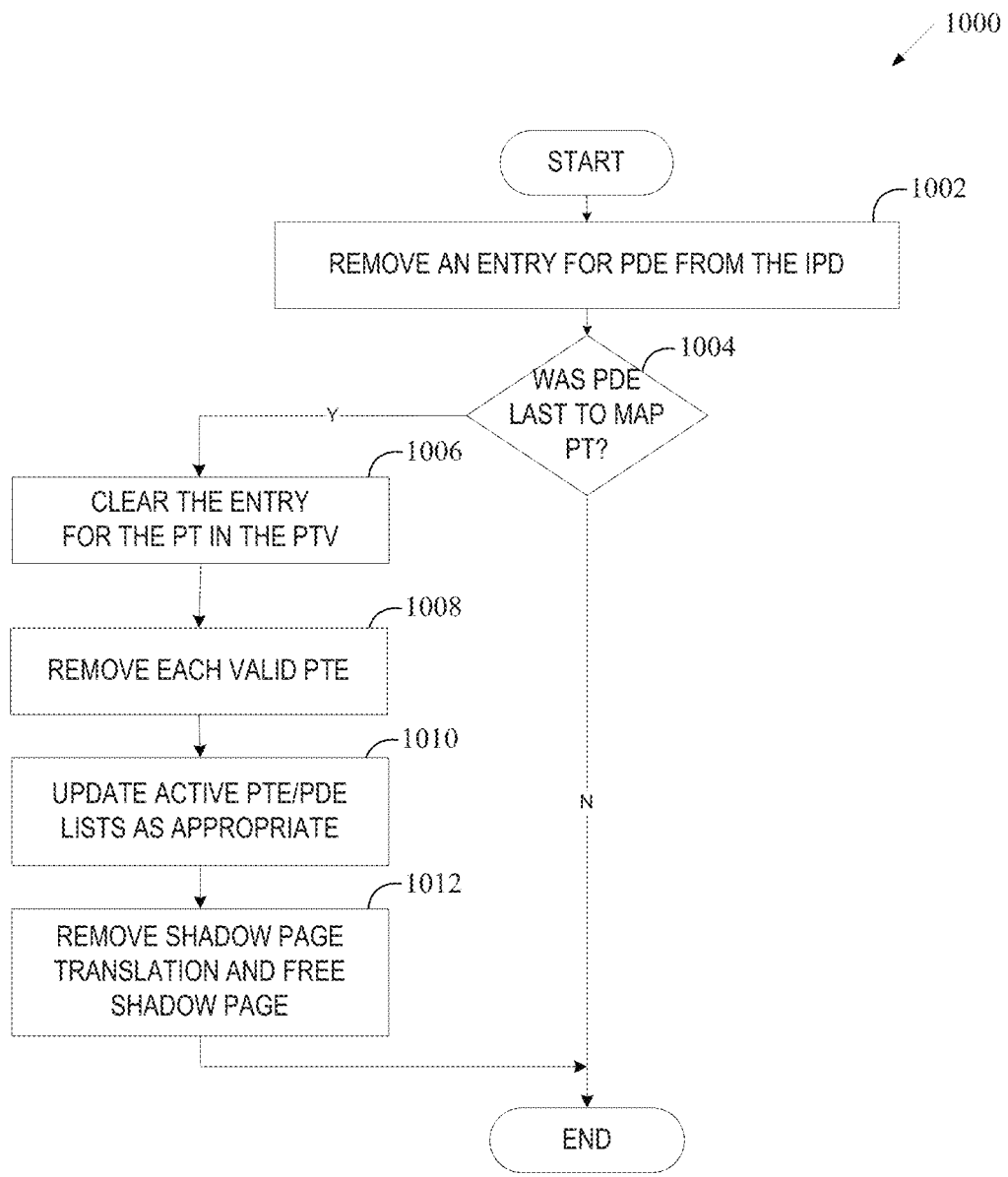
FIG. 10 is a flow diagram of one embodiment of a process for removing an entry from a PD of a shadow PT hierarchy.

FIG. 10 is a flow diagram of one embodiment of a process 1000 for removing an entry from a PD of a shadow PT hierarchy.

Referring to FIG. 10, processing logic begins with removing an entry for this PDE from the IPD PDE list (processing block 1002). If the PDE is in the active PDE list, then the active PDE list must be updated.

At processing block 1004, processing logic determines whether the PDE was the last entry to map the corresponding PT. If not, process 1000 ends. If so, processing logic clears the entry for the PT in the PTV (processing block 1006), removes each valid PTE (processing block 1008), updates the active PTE/PDE lists that map this PT for PT coverage (processing block 1010), and removes the shadow page translation and free the memory used to store the PT shadow page (processing block 1010).

Figure 11:
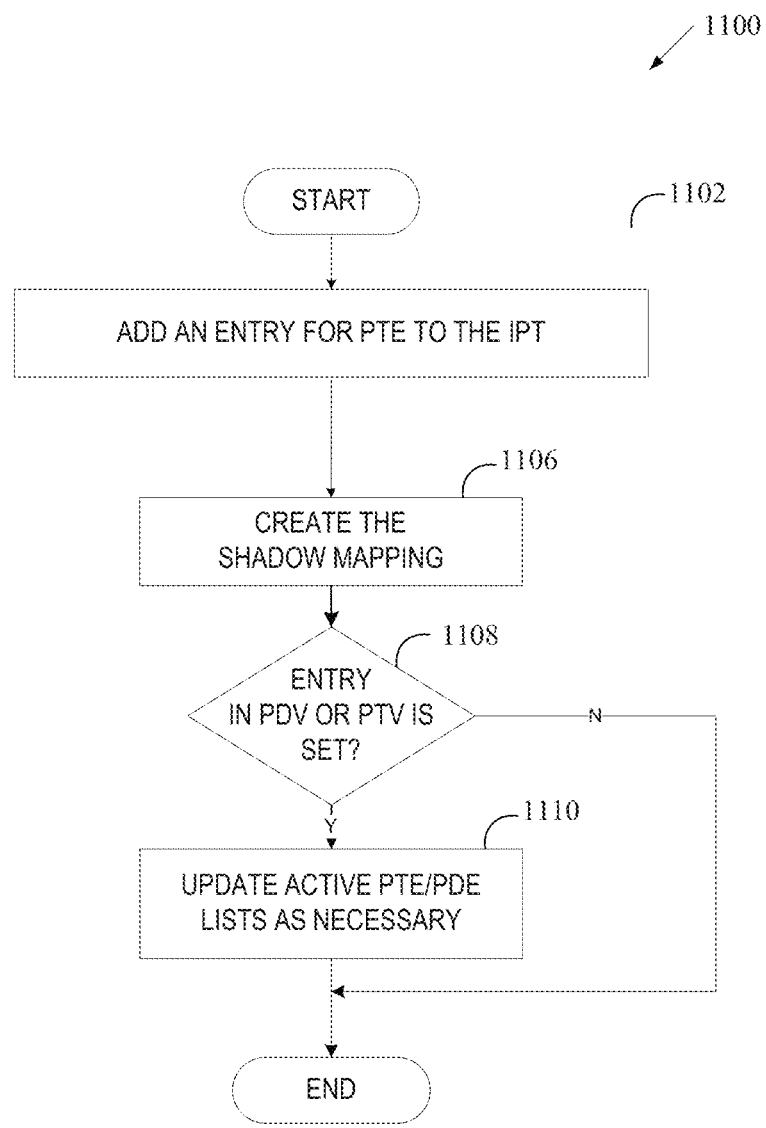
FIG. 11 is a flow diagram of one embodiment of a process for adding an entry to a PT of a shadow PT hierarchy.

FIG. 11 is a flow diagram of one embodiment of a process 1100 for adding an entry to a PT of a shadow PT hierarchy.

Referring to FIG. 11, processing logic begins with adding an entry for this PTE to the IPT (processing block 1102).

At processing block 1106, processing logic creates the shadow mapping and proceeds to processing block 1108.

At processing block 1108, processing logic determines whether a corresponding entry in the PDV or PTV is set. If not, process 1100 ends. If so, processing logic adds this entry to the active PTE list and updates associated metadata indicating if it maps a PD and/or PT page (processing block 1110). If the active PTE entry just created is the first for this page table, then the IPD must be consulted and each PDE which maps this page table page added to the active PDE list.

Figure 12:
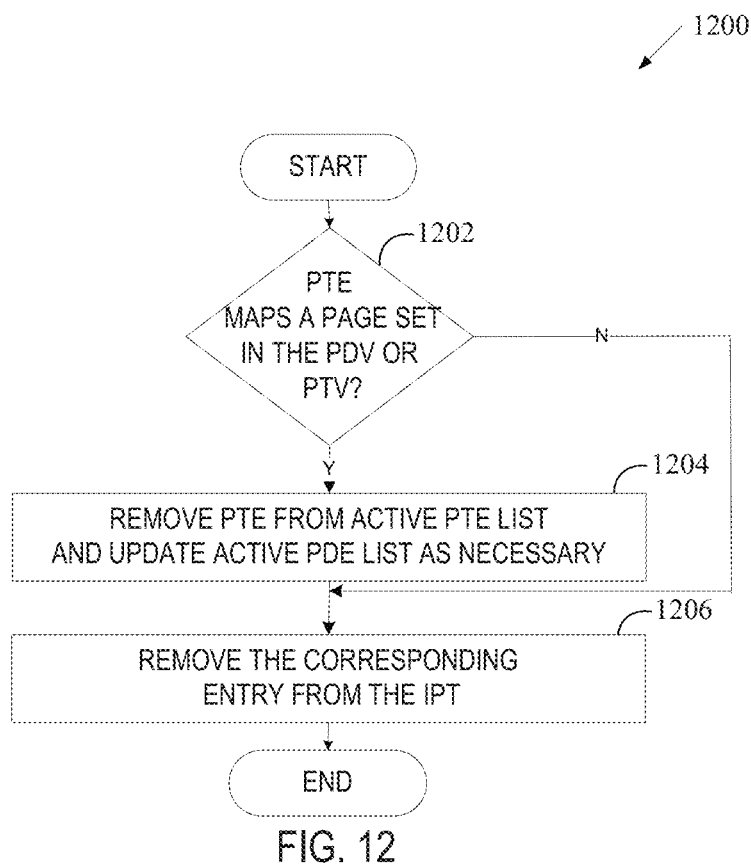
FIG. 12 is a flow diagram of one embodiment of a process for removing an entry from a PT of a shadow PT hierarchy.

FIG. 12 is a flow diagram of one embodiment of a process 1200 for removing an entry from a PT of a shadow PT hierarchy.

Referring to FIG. 12, processing logic begins with determining whether this PTE maps a page set in the PDV or PTV (processing block 1202). If not, processing logic proceeds to processing block 1206. If so, processing logic removes the PTE from the active PTE list. If this was the last active PTE list element in the PT, then PDEs referencing this PT are removed from the active PDE list (processing block 1204), and proceeds to processing block 1206.

At processing block 1206, processing logic removes the corresponding entry from the IPT.

Figure 13:
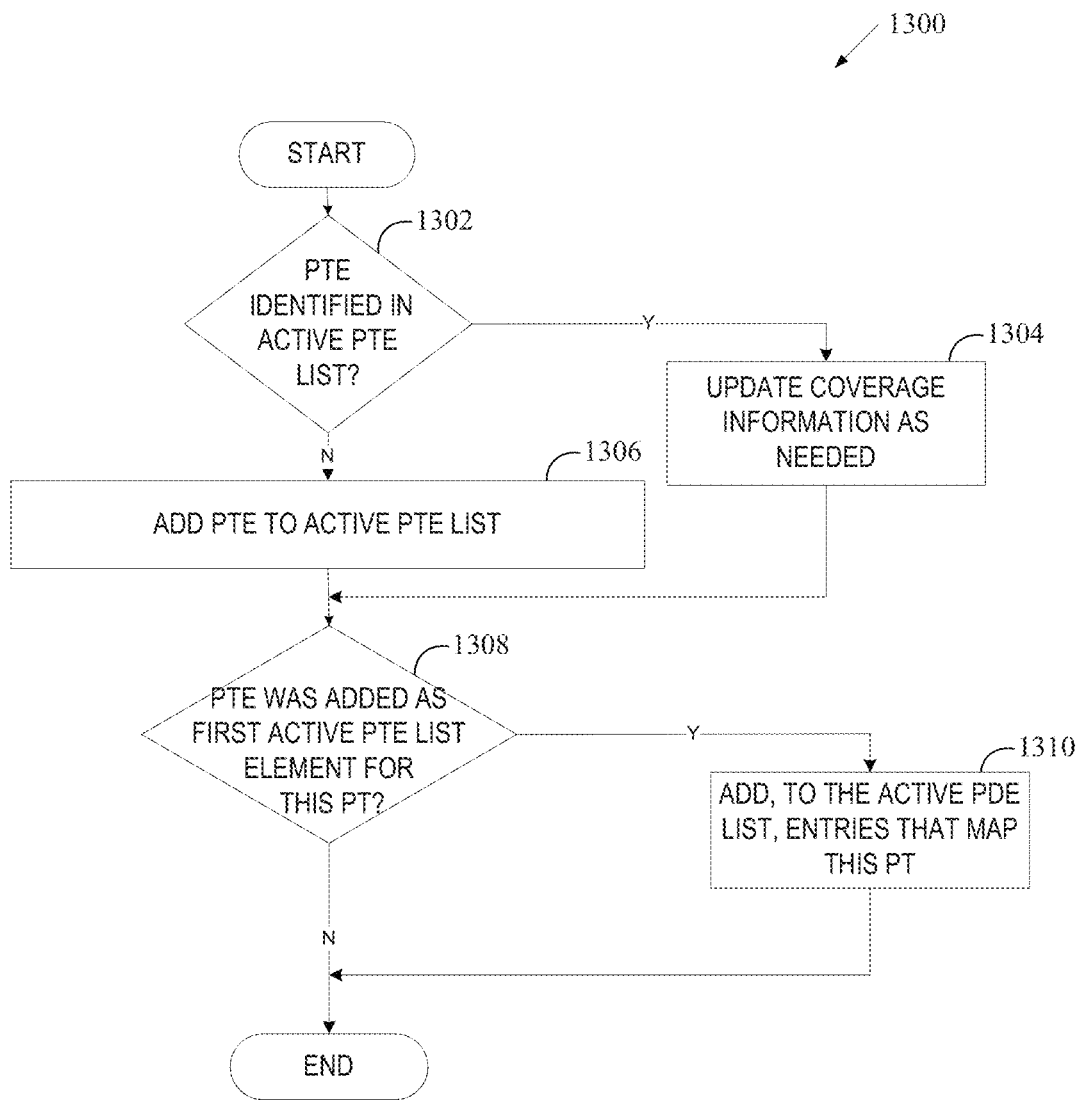
FIG. 13 is a flow diagram of one embodiment of a process for monitoring a PTE of a shadow PT hierarchy.

FIG. 13 is a flow diagram of one embodiment of a process 1300 for monitoring a PTE of a shadow PT hierarchy. The steps shown in FIG. 13 represent the processing that may be required when the monitor recognizes that a page which has been mapped as a data page is being used as a page directory or page table page. This process will therefore be triggered by a status change for the page mapped by the PTE.

Referring to FIG. 13, processing logic begins with determining whether the PTE is identified in the active PTE list (processing block 1302). If so, processing logic adds the previously missing coverage (processing block 1304). This flow is triggered by a status change of the mapped page. Since this ME was already in the active PTE list, it must be the case that the frame mapped by this PTE was previously in use as a PT or PD, and is now in use in the other capacity as well. Such information may be explicitly stored with the entry or in associated metadata. If the PTE is not in the active PTE list, processing logic adds the PTE to the active PTE list and updates metadata accordingly (processing block 1306).

Next, at processing block 1308, processing logic determines whether the PTE is the first active PTE list entry for this PT. If not, process 1300 ends. If so, processing logic adds, to the active PDE list, entries that map this PT (as found through the IPD) (processing block 1310).

Figure 14:
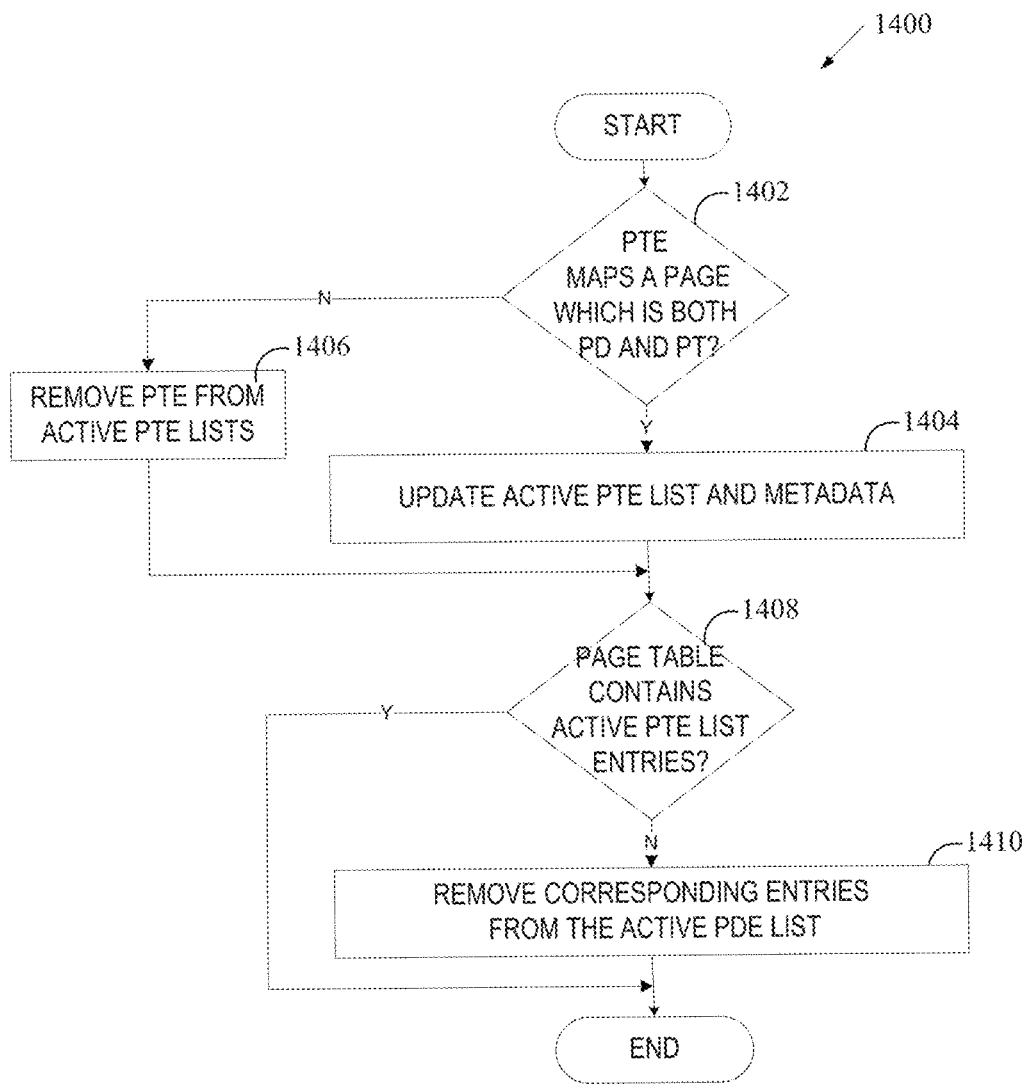
FIG. 14 is a flow diagram of one embodiment of a process for removing monitoring from a PTE of a shadow PT hierarchy.

FIG. 14 is a flow diagram of one embodiment of a process 1400 for decreasing the monitoring coverage provided by a PTE of a shadow PT hierarchy. This process might be invoked when a process is removed from the working set, or the last PDE to reference a page table is removed, resulting in a change of status of a previously monitored page directory or page table page.

Referring to FIG. 14, processing logic begins with determining whether this PTE had monitored a page that was both a page table and page directory page (processing block 1402). If so, processing logic reduces the coverage level, indicating that the PTE now monitors a page as either a PT or as a PD, but not both (processing block 1404). If not, processing logic removes the PTE from the active VIE list (processing block 1406). Note that if the PTE was an element for a page tracked for its use in a single capacity, then it must now be the case that the page no longer requires monitoring.

Next, if the last active PTE list element in the PT was removed (processing block 1408), processing logic removes the corresponding entries which mapped this page table from the active PDE list (as found through the IPD) (processing block 1410).

As discussed above, bare platform hardware 116 comprises multiple physical processors, including processors 118 and 119. Within a virtual machine environment, each physical processor or any combination of physical processors may be used to support one or more virtual processors. When shared shadow page tables are used in a multiprocessor system, several consistency issues can arise which must be handled appropriately in order to preserve correctness. The main source of these problems is the existence of a separate hardware TLB for each physical processor. There are cases, when shadow page tables were changed on one physical processor, but one or more other physical processors may contain old inconsistent mapping in their hardware TLB and be able to perform updates of some guest page tables without any ability of the memory virtualization algorithm to recognize and track such modifications. In order to solve such problems, IPIs (Inter Processor Interrupts) may be sent to synchronize the TLBs of other physical processors. In some implementations, guest execution may be halted during shadow page table modifications to simplify state tracking and shadow page table management.

Embodiments of the present invention may be used to eliminate the need for IPIs without imposing additional memory overhead as the number of virtual processors is increased. This may be achieved through the addition of tracking data to monitor processors which might still contain writeable mappings to shadow page table pages and added synchronization phases while such mappings are present.

Figure 15:
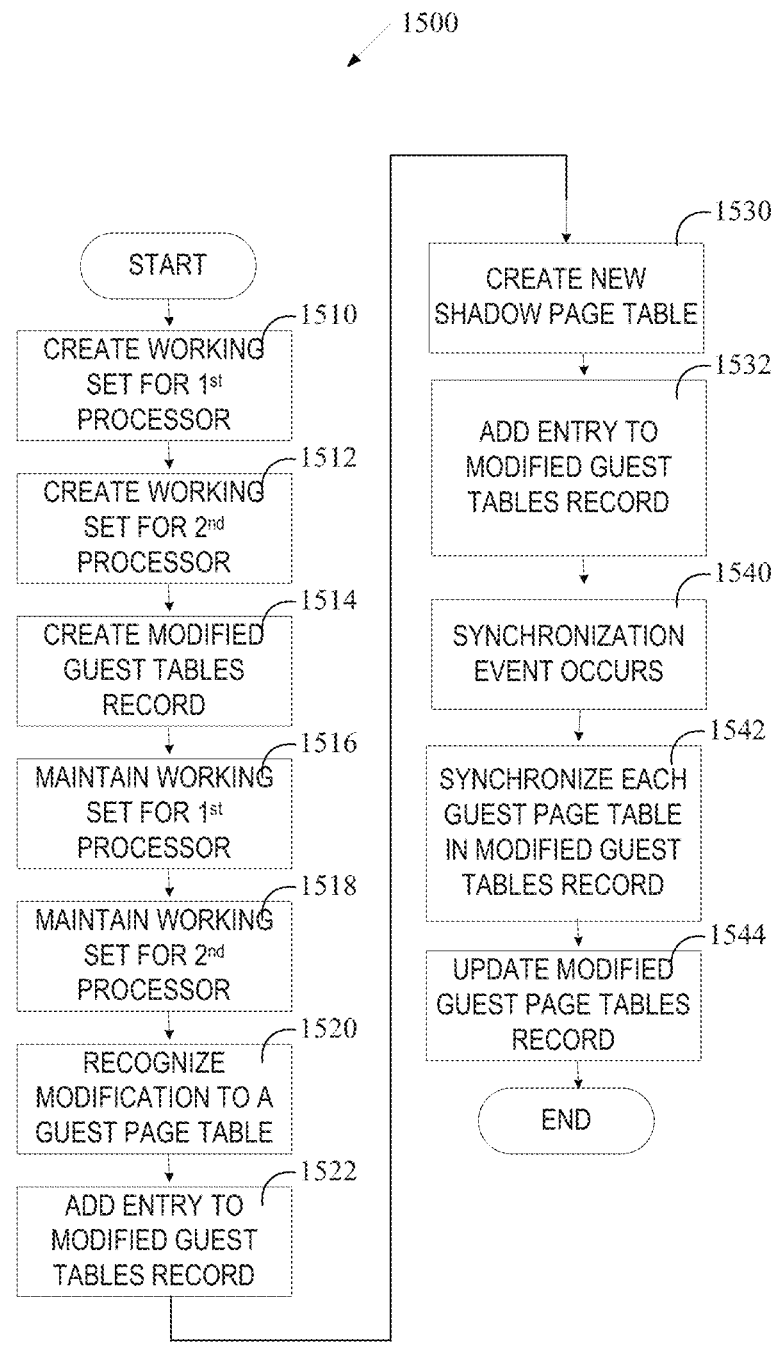
FIG. 15 is a flow diagram of one embodiment of a process for maintaining shadow PT hierarchies in a multiprocessor system.

FIG. 15 is a flow diagram of one embodiment of a process 1500 for maintaining shadow PT hierarchies in a multiprocessor system. In processing block 1510, a working set of shadow PT hierarchies for one processor, e.g., processor 118, is created. The shadow PT hierarchies for processor 118 use TLB 122 to store virtual to physical address translations. In processing block 1512, a working set of shadow PT hierarchies for another processor, e.g., processor 119, is created. The shadow PT hierarchies for processor 119 use TLB 123 to store virtual to physical address translations. The working set for processor 118 may differ from the working set for processor 119 because different VMs may be run on different processors, or for any other reason. However, any page frames, PTs, and PFs may be included in the working set for more than one processor. Working sets for any number of additional processors may also be created within the scope of the present invention.

In processing block 1514, a modified guest tables record is created. The modified guest tables record may be a list or any other type of data structure in which to store a record of which guest page tables have been modified. For each modified guest page table, a record is kept of which processors may still contain, in the processor's hardware TLB, a writable reference to that guest page table. For example, a modified guest tables record may include a bitvector for each modified guest page table, with one bit in the bitvector for each processor in the system, where each bit may be used to record whether or not the corresponding processor's hardware TLB may still contain a writable reference to the modified guest page table.

In processing block 1516, the working set for processor 118 is maintained as described above, e.g., by extracting metadata from each new shadow PT hierarchy, storing the metadata in the VTLB data store 124, and updating the metadata when the shadow PT hierarchy is modified. The metadata may include a PT vector (PTV), a PD vector (PDV), an active PTE list, an active PDE list, and any other information desired. In processing block 1518, the working set for processor 119 is maintained as described above, e.g., by extracting metadata from each new shadow PT hierarchy, storing the metadata in the VTLB data store 124, and updating the metadata when the shadow PT hierarchy is modified. The metadata may include a PT vector (PTV), a PD vector (PDV), an active PTE list, an active PDE list, and any other information desired. Although VTLB data store 124 is shown in FIG. 1 as a single block, the metadata for the working sets for any number of processors may be stored in any number of separate data structures and/or areas of memory within the scope of the present invention. For example, the metadata for the working set for processor 118 and the metadata for the working set for processor 119 may be stored in two separate data structures. Working sets for any number of additional processors may also be maintained within the scope of the present invention.

In processing block 1520, a modification to a guest page table is recognized. In processing block 1522, an entry is added to the modified guest tables record for the address of the modified guest page table, where the entry indicates that each processor in the system, including processors 118 and 119, may contain a writable reference to the guest page table in its hardware TLB.

In processing block 1530, a new shadow page table is created. In processing block 1532, an entry is added to the modified guest tables record for the address of the new shadow page table, where the entry indicates that each processor in the system, including processors 118 and 119, may contain a writable reference to the guest page table in its hardware TLB.

In processing block 1540, a synchronization event occurs on any processor in the system, for example, processor 118. In processing block 1542, each guest page table in the modified guest tables record is synchronized with the corresponding shadow page table according to process 1600 illustrated in FIG. 16. In processing block 1544, a VM exit occurs on a different processor, e.g., processor 119, resulting in a flush of that processor's hardware TLB, e.g., TLB 123, and an update to the modified guest tables record to indicate that the TLB no longer contains any writable references to a guest page table.

Figure 16:
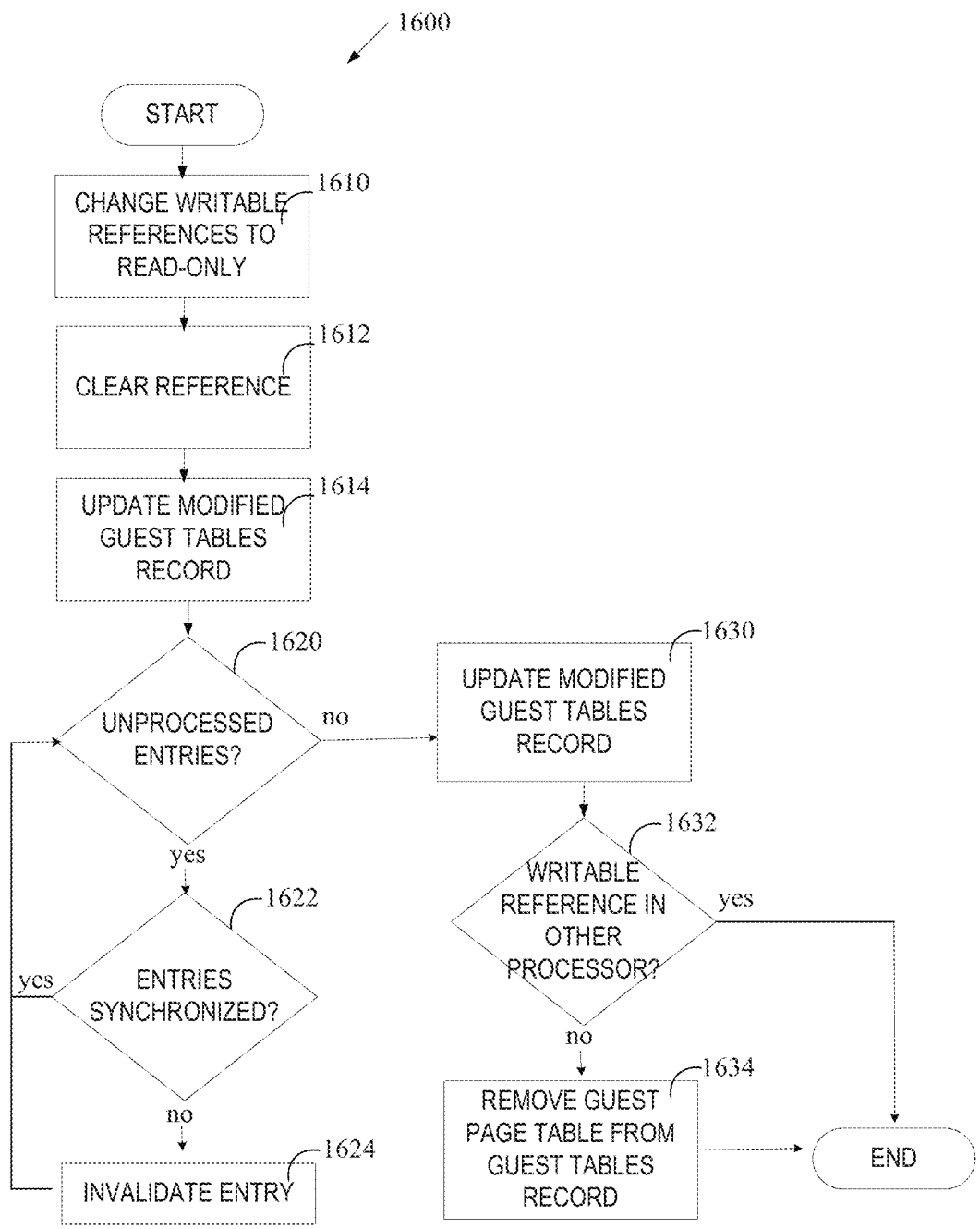
FIG. 16 is a flow diagram of one embodiment of a process for synchronizing a guest page table in a modified guest tables record with the corresponding shadow page table in a multiprocessor system.

FIG. 16 is a flow diagram of one embodiment of a process 1600 for synchronizing a guest page table in a modified guest tables record with the corresponding shadow page table in a multiprocessor system. In processing block 1610, all writable references to the guest page table in all shadow page tables are changed to read-only. In processing block 1612, the reference, if any, to the guest page table in the hardware TLB of processor 118, e.g., TLB 122, is cleared. Processing block 1612 may occur during a VM exit resulting from the recognition of the synchronization event, or may be performed by software. As a result of processing block 1612, any future write access to the guest page table on processor 118 will cause a page fault exception and the update will be recognized and recorded as in processing block 1520 in process 1500. In processing block 1614, the modified guest tables record is updated to reflect any other processors that do not contain writable references to the guest page table in their hardware TLB.

In processing block 1620, it is determined whether the guest page table contains any unprocessed entries. If it does, then in processing block 1622, it is determined whether the entry in the guest page table is synchronized with the corresponding entry in the shadow page table. If not, then in processing block 1624, the corresponding entry in the shadow page table is invalidated, e.g., changed to a status of not-present. Note that processing block 1624 is performed instead of changing the value of the shadow page table entry to the value of the guest page table entry to prevent incorrect behavior on other processors in the system.

In processing block 1630, the modified guest tables record is updated to indicate that processor 118 does not contain a writable reference to the guest page table in its hardware TLB. In processing block 1632, it is determined whether any other processor contains a writable reference to the guest page table in its hardware TLB. If not, then in processing block 1634, the record for the guest page table is removed from the modified guest tables record. Note that synchronization of the guest page table occurs before removing the guest page table from the modified guest tables record to ensure that synchronization occurs after the last writable mapping has been removed from the system.

Within the scope of the present invention, any of the illustrated method embodiments may be performed in a different order, with illustrated boxes omitted, with additional boxes added, or with a combination of reordered, omitted, or additional boxes. For example, the synchronization of the working set for a processor with the current guest state on the first processor may include much more than is shown in FIG. 16.

Thus, a method and apparatus for supporting address translation in a multiprocessor virtual machine environment have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    creating a first working set of shadow page table hierarchies for a first processor of a plurality of processors, wherein the first working set of shadow page table hierarchies uses a first hardware translation lookaside buffer in the first processor to store virtual to physical address translations;
    creating a second working set of shadow page table hierarchies for a second processor of the plurality of processors;
    keeping a record of modified guest page tables, and for each modified guest page table, an indication of which of the plurality of processors have a hardware translation lookaside buffer containing a writable reference to the modified guest page table;
    synchronizing each modified guest page table with a corresponding shadow page table in the first working set;
    flushing the first hardware translation lookaside buffer; and
    updating the record of modified guest page tables to indicate that the first hardware translation lookaside buffer contains no writable references to modified guest page tables.

2. The method of claim 1 further comprising synchronizing each modified guest page table with a corresponding shadow page table in the second working set.

3. The method of claim 1 wherein synchronizing each modified guest page table with a corresponding shadow page table in the first working set and synchronizing each modified guest page table with a corresponding shadow page table in the second working set is performed without an interprocessor interrupt.

4. The method of claim 1 wherein the second working set of shadow page table hierarchies uses a second hardware translation lookaside buffer in the second processor to store virtual to physical address translations.

5. The method of claim 1 wherein the record of modified guest page tables includes a bitvector for each modified guest page table, with one bit in the bitvector for each of the plurality of processors, where each bit is to record whether the corresponding processor's hardware translation lookaside buffer contains a writable reference to the modified guest page table.

6. The method of claim 1 further comprising maintaining the first working set and the second working set by extracting metadata from each new shadow page table hierarchy, storing the metadata in a virtual translation lookaside buffer data store, and updating the metadata when the shadow page table hierarchy is modified.

7. The method of claim 1 further comprising recognizing a modification to a guest page table.

8. The method of claim 7 further comprising adding an entry to the modified guest page tables for the modified guest page table.

9. The method of claim 8, where the entry indicates that each processor in the plurality of processors contains a writable reference to the modified guest page table in its hardware translation lookaside buffer.

10. The method of claim 1 further comprising creating a new shadow page table.

11. The method of claim 10 further comprising adding an entry to the record of modified guest page tables for the new shadow page table.

12. The method of claim 11, where the entry indicates that each processor in the plurality of processors contains a writable reference to the guest page table corresponding to the new shadow page table in its hardware translation lookaside buffer.

13. A method comprising:
    synchronizing a guest page table in a modified guest tables record with a corresponding shadow page table in a multiprocessor system, including
    changing all writable references to the guest page table in all shadow page tables to read only, and
    clearing a reference to the guest page table in a first hardware translation lookaside buffer of a first processor; and
    updating the modified guest tables record to indicate that the first hardware translation lookaside buffer includes no writable reference to the guest page table.

14. The method of claim 13 further comprising:
    determining that the guest page table includes an unprocessed entry,
    determining that the unprocessed entry is not synchronized with a corresponding entry in the shadow page table, and
    invalidating the corresponding entry in the shadow page table.

15. The method of claim 13 further comprising:
    determining that a second hardware translation lookaside buffer in a second processor contains no writable reference to the guest page table, and
    removing a record for the guest page table from the modified guest tables record.

16. A system comprising:
    a first processor having a first hardware translation lookaside buffer for storing virtual to physical address translations for a first working set of shadow page table hierarchies, and
    a second processor having a second hardware translation lookaside buffer for storing virtual to physical address translations for a second working set of shadow page table hierarchies,
    wherein a modified guest page table record is kept for synchronizing each modified guest page table with a corresponding shadow page table in the first working set and the second working set, where for each modified guest page table, an indication of which of the first hardware translation lookaside buffer and the second hardware translation lookaside buffer contain a writable reference to the modified guest page table; and wherein, in connection with flushing the first hardware translation lookaside buffer, the modified guest page table record is to be updated to indicate that the first hardware translation lookaside buffer contains no writable references to modified guest page tables.

* * * * *